(12) United States Patent
Sueoka

(10) Patent No.: US 8,325,046 B2
(45) Date of Patent: Dec. 4, 2012

(54) RFID SYSTEM, READER-WRITER, AND RFID TAG

(75) Inventor: Toshio Sueoka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/568,938

(22) Filed: Sep. 29, 2009

(65) Prior Publication Data

US 2010/0085190 A1 Apr. 8, 2010

(30) Foreign Application Priority Data

Sep. 30, 2008 (JP) .............................. P2008-253138
Sep. 30, 2008 (JP) .............................. P2008-253139
Sep. 30, 2008 (JP) .............................. P2008-253140

(51) Int. Cl.
G08B 13/14 (2006.01)

(52) U.S. Cl. ................................................... 340/572.7

(58) Field of Classification Search .... 340/571.2–572.9, 340/10.3, 10.51, 10.4; 235/437, 462.25
See application file for complete search history.

(56) References Cited

U.S. PATENT DOCUMENTS

| | | | | |
|---|---|---|---|---|
| 6,286,762 | B1 * | 9/2001 | Reynolds et al. | 235/472.01 |
| 6,909,366 | B1 | 6/2005 | Marsh et al. | |
| 8,063,748 | B2 * | 11/2011 | Ochiai et al. | 340/10.51 |
| 2004/0085191 | A1 * | 5/2004 | Horwitz et al. | 340/10.3 |
| 2006/0022804 | A1 * | 2/2006 | Akiyama et al. | 340/10.51 |
| 2008/0258919 | A1 * | 10/2008 | Suzuki | 340/572.1 |

FOREIGN PATENT DOCUMENTS

| | | |
|---|---|---|
| JP | 08-167090 | 6/1996 |
| JP | 10-207996 | 8/1998 |
| JP | 2002-506300 | 2/2002 |
| JP | 2006-238381 | 9/2006 |
| JP | 2008-154177 | 7/2008 |
| WO | 99/45494 | 9/1999 |

OTHER PUBLICATIONS

English language Abstract of JP 2006-238381.
Japan Office Action in JP 2008-253138, dated Aug. 28, 2012, along with an English translation thereof.
Japan Office Action in JP 2008-253139, dated Sep. 4, 2012, along with an English translation thereof.
Japan Office Action in JP 2008-253140, dated Sep. 4, 2012, along with an English translation thereof.

* cited by examiner

Primary Examiner — Phung Nguyen
(74) Attorney, Agent, or Firm — Greenblum & Bernstein, P.L.C.

(57) ABSTRACT

A radio frequency identification (RFID) system includes a plurality of RFID tags and a reader-writer. Each of the plurality of RFID tags has a tag antenna and a tag circuit that stores identification information. The reader-writer includes a first transceiver that reads the identification information of the plurality of RFID tags using an antenna. In this regard, the first transceiver transmits a reading command via the antenna for reading the identification information of the plurality of RFID tags. When the first transceiver does not read the identification information from one of the plurality of RFID tags due to an occurrence of a reading error in the first transceiver, the reader-writer adds reading error information, which indicates the occurrence of the reading error, to the next reading command to be transmitted from the first transceiver via the antenna.

17 Claims, 14 Drawing Sheets

(a)

(b)

(c)

RFID SYSTEM, READER-WRITER, AND RFID TAG

BACKGROUND

1. Field of the Invention

The present invention relates to an RFID system, a reader-writer, and an RFID tag.

2. Description of the Related Art

In recent years, RFID (Radio Frequency IDentification) tags having predetermined identification information given thereto were widely used and RFID systems for managing production, physical distribution, products, and the like were suggested. The RFID system includes RFID tags attached to plural products and a reader-writer, reading the identification information of the RFID tags (for example, see Patent Document 1).

Patent Document 1: JP-A-2006-238381

In known RFID systems, when the reader-writer transmits a reading command, plural unspecified RFID tags existing in a range where RF waves arrive respond at a time. Accordingly, when response signals in the same RF band from the plural RFID tags collide with each other, or the like, only the response signal having the highest signal level was read and thus it was difficult to read all the RFID tags. Therefore, when the reading could not be made at a predetermined time to read, there is a problem that a non-read RFID tag which is permanently not detected remains.

SUMMARY

The invention is contrived to solve the above-mentioned problem. An object of the invention is to prevent non-read RFID tags from remaining when plural unspecified RFID tags exist in a range where RF waves of a reader-writer arrive.

To accomplish the above-mentioned object, the invention provides an RFID system as described below. The RFID system includes: a plurality of RFID tags each having a tag antenna unit and a tag circuit unit storing identification information; and a reader-writer including a first transceiver unit reading the identification information of the plurality of RFID tags using an antenna. Here, when the identification information to be read is not read from one of the plurality of RFID tags due to an occurrence of a reading error in the first transceiver unit after a reading command for reading the identification information is transmitted via the antenna from the first transceiver unit, the reader-writer adds reading error information, which states that the reading error occurs, to the reading command to be transmitted next and transmits the resultant command from the first transceiver unit via the antenna.

Another object of the invention is to prevent the reading-completion flag from erroneously being set to the reading-completion state.

Another object of the invention is to prevent a tag from not erroneously replying, even when the reading error occurs in the transceiver unit of the reader-writer and one of QueryRep commands repeatedly transmitted within a time equal to or smaller than $1/10$ of the time to read the identification information happens to be received in the RFID tag at a regular time after T seconds.

Another object of the invention is to construct the reading error information with the least necessary amount of information.

Another object of the invention is to prevent a non-read REID tag from remaining when plural unspecified RFID tags exist in a range where the RF waves of the reader-writer arrive and to reduce the processing time when the probability of collision is suppressed by increasing the number of slots.

Another object of the invention is to efficiently determine the division number of time slots on the basis of the presence signal.

Another object of the invention is to easily increase or decrease the division number of time slots on the basis of a predetermined detected value.

Another object of the invention is to prevent a non-read RFID tag from remaining when plural unspecified RFID tags exist in a range where the RF waves of the reader-writer arrive and to prevent the reading efficiency from decreasing when a new RFID tag is added to a predetermined communication area.

Another object of the invention is to set the auxiliary flag on the basis of an auxiliary reset command.

Another object of the invention is to initialize the reading-completion flag on the basis of the state of the auxiliary flag.

Another object of the invention is to set the auxiliary flag when the reading-completion flag is set to the reading-completion state.

Another object of the invention is to initialize the reading-completion flag after a predetermined time passes.

Another object of the invention is to provide a reader-writer that can prevent a non-read REID tag from remaining when plural unspecified RFID tags exist in a range where the RF waves of the reader-writer arrive.

DETAILED DESCRIPTION

Hereinafter, preferred embodiments of the invention will be described with reference to the accompanying drawings.
(First Embodiment)

The entire configuration and operations of an RFID system 1 according to a first embodiment of the invention will be first described with reference to FIG. 1.

Figure 1:
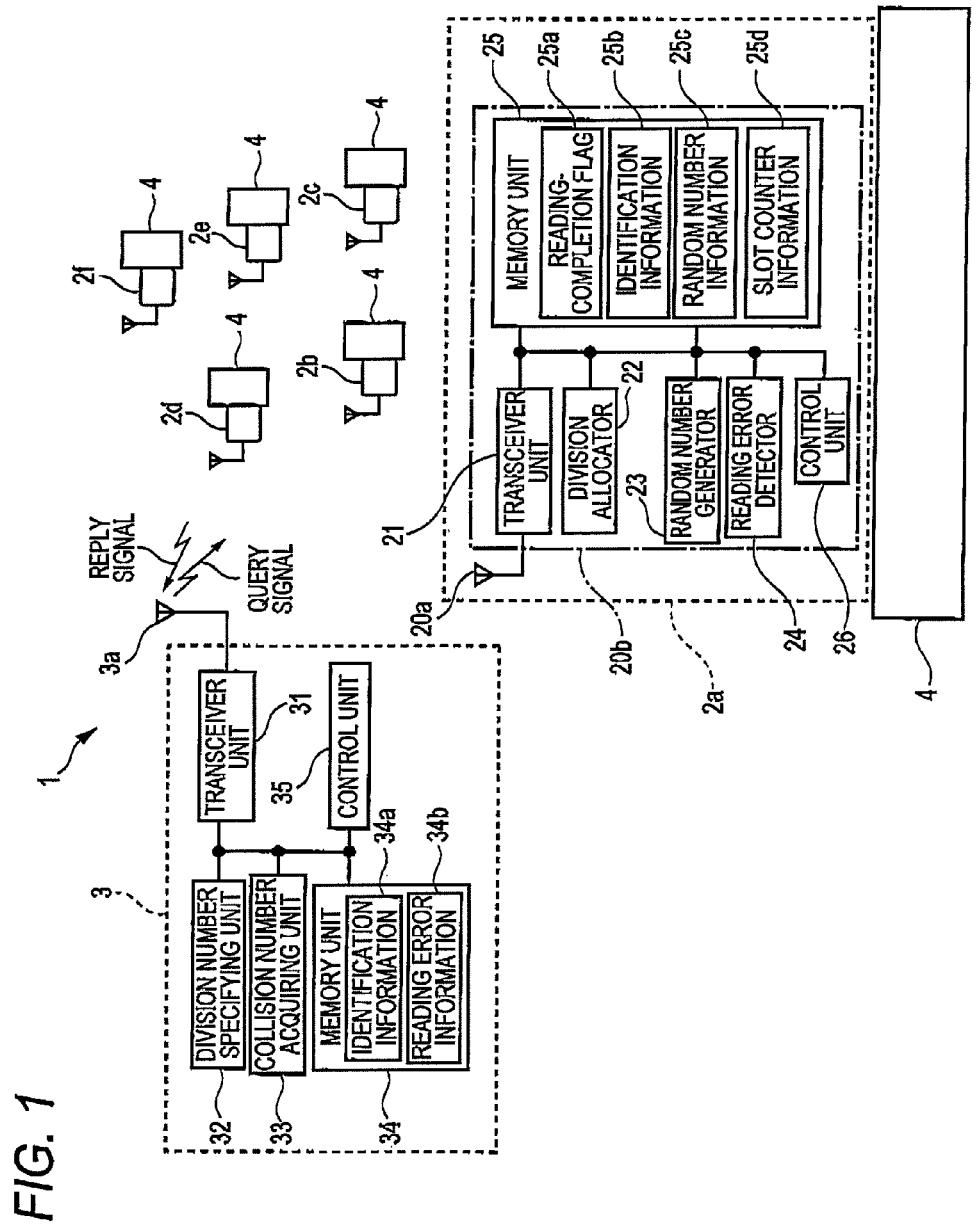
FIG. 1 is a diagram schematically illustrating an RFID system according to a first embodiment of the invention.

FIG. 1 is a diagram schematically illustrating an RFID system 1 according to a first embodiment of the invention. For example, products stored and managed in a storehouse or the like are described here as managing articles 4. In the storehouse, plural managing articles 4 are loaded by palettes or the like and carried by fork lifts from unspecified places. Since the plural managing articles 4 are forwarded to unspecified places, the management is very troublesome. In the first embodiment, as shown in FIG. 1, RFID tags 2a to 2f are attached to the managing articles 4 and the managing articles are managed by the RFID system 1 by reading the RFID tags 2a to 2f by the use of a reader-writer 3.

In this way, the RFID system 1 includes the RFID tags 2a to 2f and the reader-writer 3. For the purpose of easy understanding, plural RFID tags 2a, 2b, 2c, 2d, 2e, 2f, . . . are referred to as RFID tags 2 in the following description. In the first embodiment, the number of RFID tags 2 is 6, but is not limited to the number.

The RFID tags 2 attached to the managing articles 4 store identification information of the corresponding managing articles 4 (for example, product name, product number, manufacturing date, and forwarding date) and for example, "where product number B of product name A is currently located" is thus managed.

The reader-writer 3 shown in FIG. 1 perform the management. The reader-writer 3 communicates with the RFID tags 2 via a transceiver unit 31 and an antenna 3a and reads and manages the individual identification information 25b stored in tag circuit units 20b of the RFID tags 2 via tag antenna units 20a. The reader-writer 3 may be connected to a management device (not shown) located at a remote place for use. Accordingly, it is possible to efficiently manage the managing articles 4 in mass.

Each RFID tag 2 includes a tag antenna unit 20a and a tag circuit unit 20b. The tag circuit unit 20b includes a transceiver unit 21, a division allocator 22, a random number generator 23, a reading error detector 24, a memory unit 25, and a control unit 26.

The transceiver unit 21 communicates with the reader-writer 3 via the tag antenna unit 20a and transmits and receives various reading commands or the identification information 25b.

The division allocator 22 allocates one of plural divided time slots to the corresponding tag on the basis of a predetermined value called Q value (the value used to specify the number of time slots), which will be described later, received from the reader-writer 3 via the tag antenna unit 20a and the transceiver unit 21. For example, when the number of time slots is 8, one value of "0" to "7" is allocated to the corresponding tag.

The random number generator 23 generates a random number used to allocate the time slots. The random number generator 23 also generates an authenticating random number used for the reader-writer 3 to authenticate and select a tag.

The reading error detector 24 acquires a reading command transmitted from the reader-writer 3 via the transceiver unit 21 and determines whether the reading error of the identification information 25b occurs in the transceiver unit 31 of the reader-writer 3 on the basis of the reading error information added to the reading command, as described later. The details of the reading error detector 24 will be described later.

The memory unit 25 stores a reading-completion flag 25a, the identification information 25b, the random number information 25c, and the slot counter information 25d. The identification information 25b includes identification information (such as product name, product number, manufacturing date, and forwarding date) of the managing article 4. The random number information 25c temporarily stores a random number generated by the random number generator 23. The slot counter information 25d temporarily stores the value of the time slot number allocated to the corresponding tag.

The control unit 26 includes a central processing unit (CPU), a read only memory (ROM) storing various programs and a control program, and a random access memory (RAM) temporarily storing data or the like and controls the constituent circuits. When the reading error is not detected by the reading error detector 24 and the identification information 25b of the RFID tags 2 is normally read by the reader-writer 3, the control unit 26 sets the reading-completion flag 25a to a reading-completion state. The control unit 26 controls the reading-completion flag 25a not to reply to the subsequent reading command when it is set to the reading-completion state.

The reader-writer 3 has the following configuration to read the identification information 25b from the RFID tags 2.

That is, the reader-writer 3 includes a transceiver unit 31, a division number specifying unit 32, a collision number acquiring unit 33, and a memory unit 34.

The transceiver unit 31 communicates with the RFID tags 2 via the antenna 3a and transmits and receives various reading commands or the identification information 25b.

The division number specifying unit 32 specifies the number of time slots. In the standard (for example, EPC Class-1 Generation 2 standard), the number of time slots is usually expressed by $2^Q$ (where Q is a positive integer) and Q is called a Q value. In the EPC Class-1 Generation 2 standard, Q is equal to or greater than 0 and equal to or less than 15.

When two or more RFID tags 2 reply and collide in each time slot, the collision number acquiring unit 33 counts the collision number as "1". The division number specifying unit 32 updates the number of time slots to be set in the next round on the basis of the collision number.

The memory unit 34 stores the identification information 34a and the reading error information 34b acquired from the RFID tags 2 via the antenna 3a and the transceiver unit 31.

The control unit 35 includes a central processing unit (CPU), a read only memory (ROM) storing various programs and a control program, and a random access memory (RAM) temporarily storing data or the like and controls the constituent circuits. When a reading error of the identification information 25b occurs in the transceiver unit 31 at the time of reading the identification information 25b from the RFID tags 2, the control unit 35 sets the reading error information 34b.

When transmitting a next reading command to the plural RFID tags 2 via the transceiver unit 31 and the antenna 3a, the control unit adds the reading error information 34b to the reading command and transmits the added reading command. The details thereof will be described later.

Figure 2:
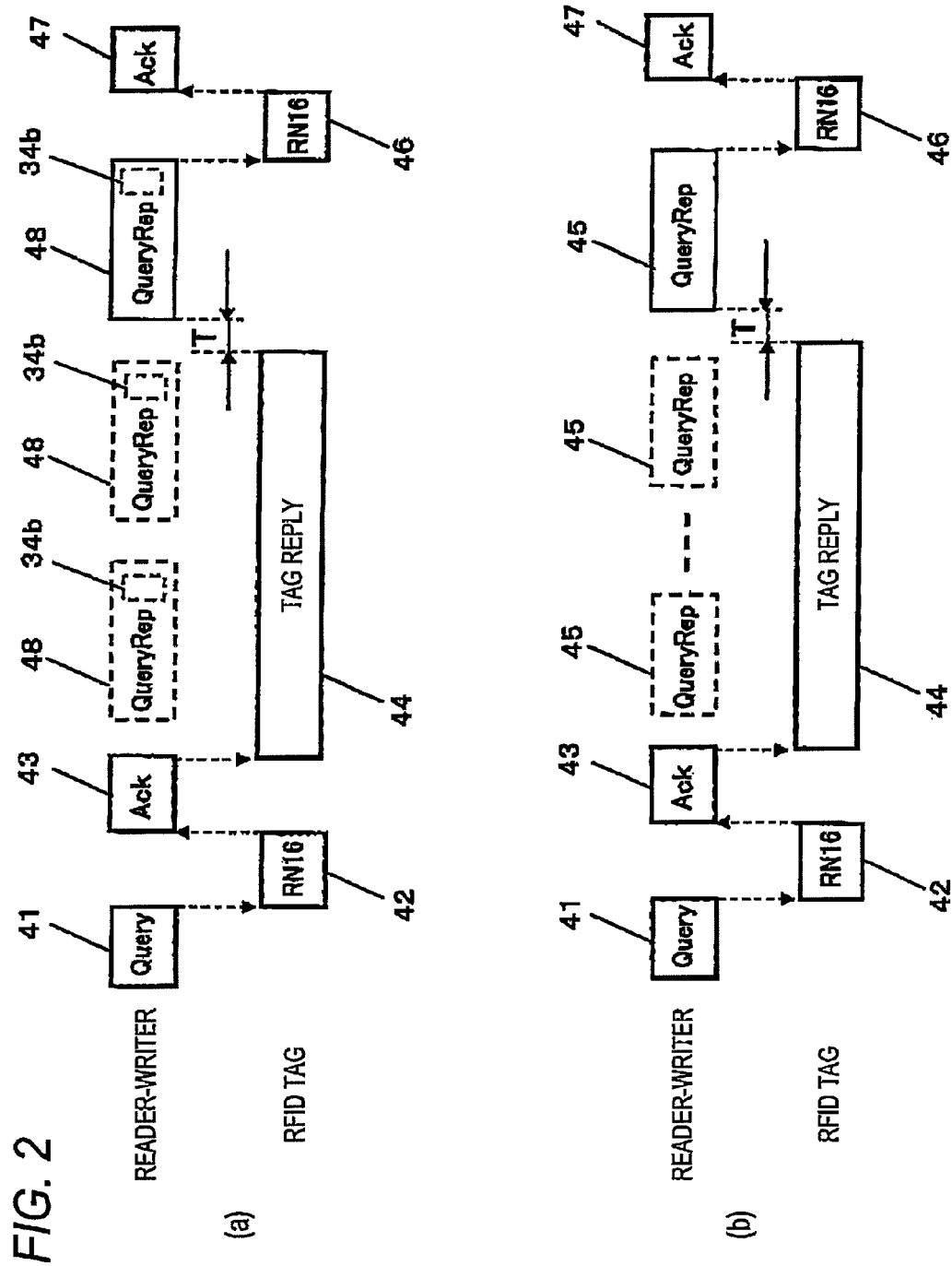
FIG. 2(a) is a diagram schematically illustrating a communication operation of the RFID system according to the first embodiment of the invention.
FIG. 2(b) is a diagram schematically illustrating a communication operation of a comparative example of the RFID system according to the first embodiment of the invention.

The communication operation based on the reading command in the RFID system 1 will be described now with reference to FIGS. 1 and 2. FIG. 2 is a diagram schematically illustrating the communication operation of the RFID system 1 according to the first embodiment of the invention, where FIG. 2(a) is a diagram schematically illustrating the communication operation of the RFID system 1 according to the first embodiment of the invention and FIG. 2(b) is a diagram schematically illustrating the communication operation in a comparative example of the RFID system 1.

First, for the purpose of easy understanding of the first embodiment, the comparative example of the first embodiment will be described with reference to FIG. 2(b). In this example, the RFID tags 2 and the reader-writer 3 communicate with each other using the past reading command.

That is, as shown in FIG. 2(b), a Query command 41 that is the reading command is first transmitted from the reader-writer 3. Here, it is assumed that the Q value is specified as "3" by the Query command 41 and the number of time slots is thus "8".

When the RFID tags 2 located in the communication area of the reader-writer 3 receive the Query command 41, the random number generators 23 allocate one of 8 time slots to the corresponding tags on the basis of the number of time slots indicated by the Query command 41. Specifically, the random number generator 23 generates one value of "0" to "7" and temporarily stores the generated value as the slot counter information 25d in the memory unit 25. For example, it is assumed that the slot counter information 25d of the RFID tags 2a to 2f is "2", "1", "3", "0", "5", and "2".

Only the RFID tag having the slot counter information 25d of "0" out of the RFID tags 2a to 2f can reply and generates and transmits predetermined identification information, for example, a hexadecimal random number 42 (RN16). In this example, since the slot counter information of the RFID tag 2d is "0", the RFID tag 2d generates and transmits the hexadecimal random number 42 (RN16). This random number is temporarily stored as the random number information 25c in the memory unit 25. It is assumed that the random number 42 is "0xA12B".

The reader-writer 3 receives the random number 42 from the RFID tag 2d via the antenna 3a and the transceiver unit 31 and determines that no collision occurs, when it can normally read the random number 42. The reader-writer 3 transmits an Ack command 43 having the value "0xA12B" of the received random number 42 as an argument to the RFID tag 2d.

The RFID tags 2a to 2f receive the Ack command 43 and determine whether the random number having the same value as the value "0xA12B" is stored in their memory units 25. Here, since only the RFID tag 2d stores the value "0xA12B" as the random number information 25c in the memory unit 25, the RFID tag 2d transmits the identification information 25b stored in the memory unit 25 to the reader-writer 3 via the transceiver unit 21. Accordingly, one tag out of the RFID tags 2a to 2f is selected.

The reader-writer 3 receives the identification information 25b of the selected RFID tag 2d via the transceiver unit 31 (tag reply 44) and stores and accumulates the received identification information 25b as the identification information 34a in the memory unit 34. Accordingly, the identification information 25b of the RFID tag 2d is acquired by the reader-writer 3.

The reader-writer 3 transmits a QueryRep command 45 within T seconds after the transceiver unit 31 receives the identification information 25b (tag reply 44). By using the QueryRep command 45 along with the Ack command 43 indicating that the identification information 25b of the RFID tag 2d is normally read by the reader-writer 3, a redundant command is omitted to realize the high-speed communication. The redundant command can be omitted, since the tag communicating just before can easily be specified due to the definition that the QueryRep command 45 is transmitted within a predetermined time of T seconds (within the time of $T_2$ in the EPC Class-1 Generation 2 standard) and the QueryRep command 45 can be used instead of the Ack command 43.

The control unit 26 of the RFID tag 2d considers that the identification information 25b normally is read when the QueryRep command 45 is received within T seconds, sets the reading-completion flag 25a to the reading-completion state, and controls the reading-completion flag not to reply to the subsequent reading command. For example, the 1-bit flag of the reading-completion flag 25a is inverted and set from "0" to "1".

Accordingly, the control units 26 of the RFID tags 2a to 2c and the RFID tags 2e and 2f other than the RFID tag 2d decrease the value of the slot counter information 25d in the memory unit 25 by one.

Here, when a preamble of a reading synchronization signal or the like is not detected to cause a reading error in the course of receiving the identification information 25b in the transceiver unit 31 of the reader-writer 3 (tag reply 44), the reception is stopped at that time and a next QueryRep command 45 is re-transmitted. As for the reason for failing in detecting a preamble, it can be considered that the signal level to be detected is small and the reply signal is thus hardly distinguished from other noises, thereby easily causing an erroneous operation.

However, a problem may be caused in this communication operation. That is, when the RFID tag 2d happens to receive one of the QueryRep commands 45a re-transmitted several times from the reader-writer 3 at a regular time after T seconds, the control unit 26 determines that the identification information 25b normally is read and thus sets the reading-completion flag 25a in the memory unit 25 to the reading-completion state. In the RFID tag 2d, when the reading-completion flag 25a is set to the reading-completion state, the control unit 26 controls the reading-completion flag not to reply to the subsequent reading command transmitted from the reader-writer 3. Accordingly, there is a problem that the RFID tag 2d remains as a non-read tag.

Therefore, in the first embodiment of the invention, such a problem is solved as shown in FIG. 2(a). The same reference numerals and signs as shown in FIG. 2(b) reference the same or corresponding elements.

That is, the reader-writer 3 adds the reading error information 34b, which is new information of 1 bit, to the QueryRep command 48 retransmitted due to the reading error. Here, when the reading error occurs in the transceiver unit 31 in the course of receiving the identification information 25b (tag reply 44) and thus the reader-writer 3 cannot read the identification information 25b, it is assumed that the transceiver unit 31 stops the reception and re-transmits a QueryRep command 48 as a next reading command. It is also assumed that the RFID tag 2d happens to receive one of the QueryRep commands 48 at a regular time.

In this case, since the RFID tag 2d includes the reading error detector 24, the reading error information 34b added to the QueryRep command 48 is read by the reading error detector 24 via the tag antenna unit 20a and the transceiver unit 21. The control unit 26 of the RFID tag 2d can determine whether a reading error of the identification information 25b occurs in the reader-writer 3 on the basis of the detection result of the reading error detector 24. Since the control unit 26 sets the reading-completion flag 25a to the reading-completion state on the basis of the detection result of the reading error detector 24, it is possible to prevent the reading-completion flag from erroneously being set to the reading-completion state.

Accordingly, the RFID tag 2d can be made to reply until the identification information 25b thereof is normally read by the reader-writer 3. As a result, even when plural unspecified RFID tags exist in the area where the RF waves of the reader-writer 3 arrive, it is possible to prevent a non-read RFID tag from remaining.

The operation of the RFID system 1 will be described now with reference to FIGS. 3 and 4.

Figure 3:
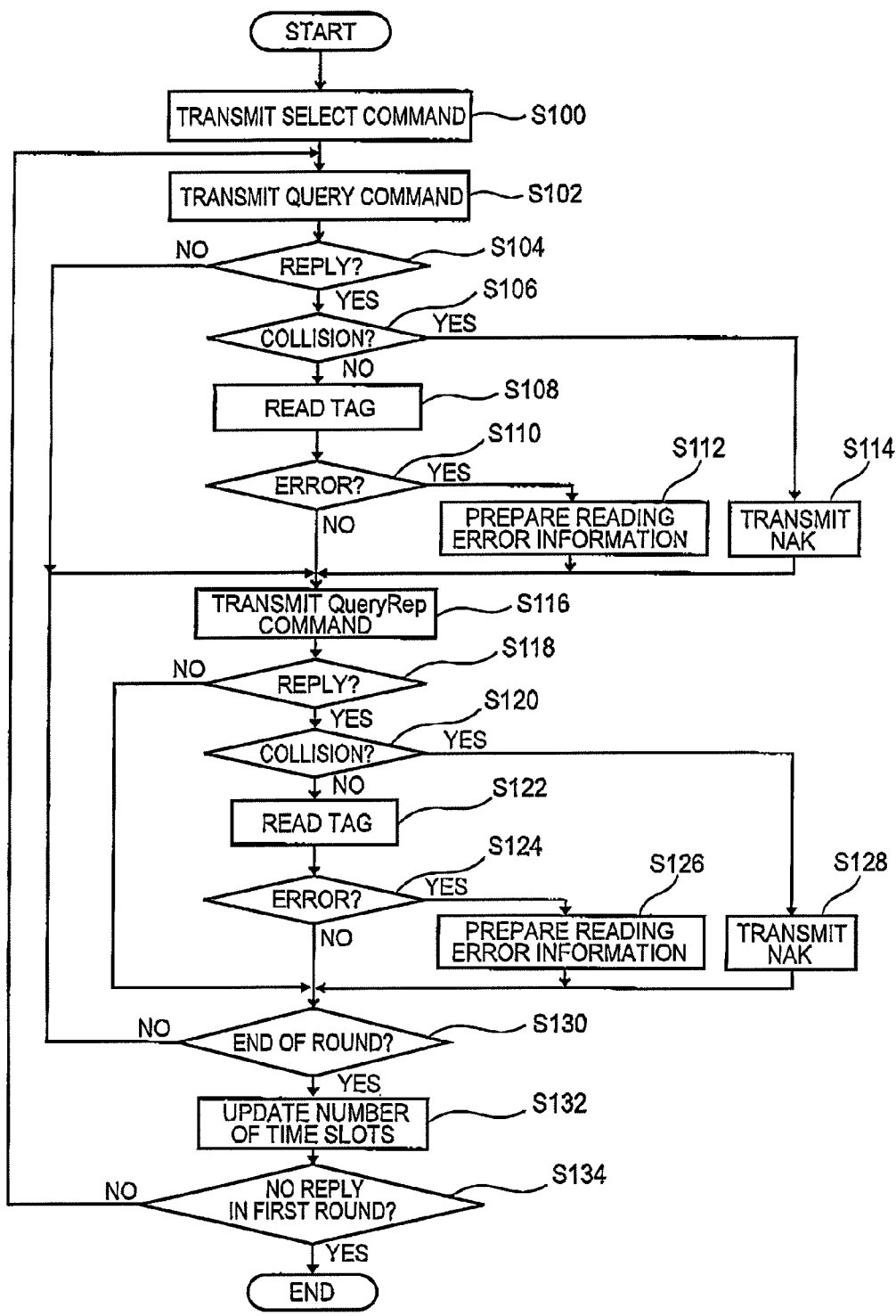
FIG. 3 is a flowchart illustrating the operation of the RFID system according to the first embodiment of the invention.
Figure 4:
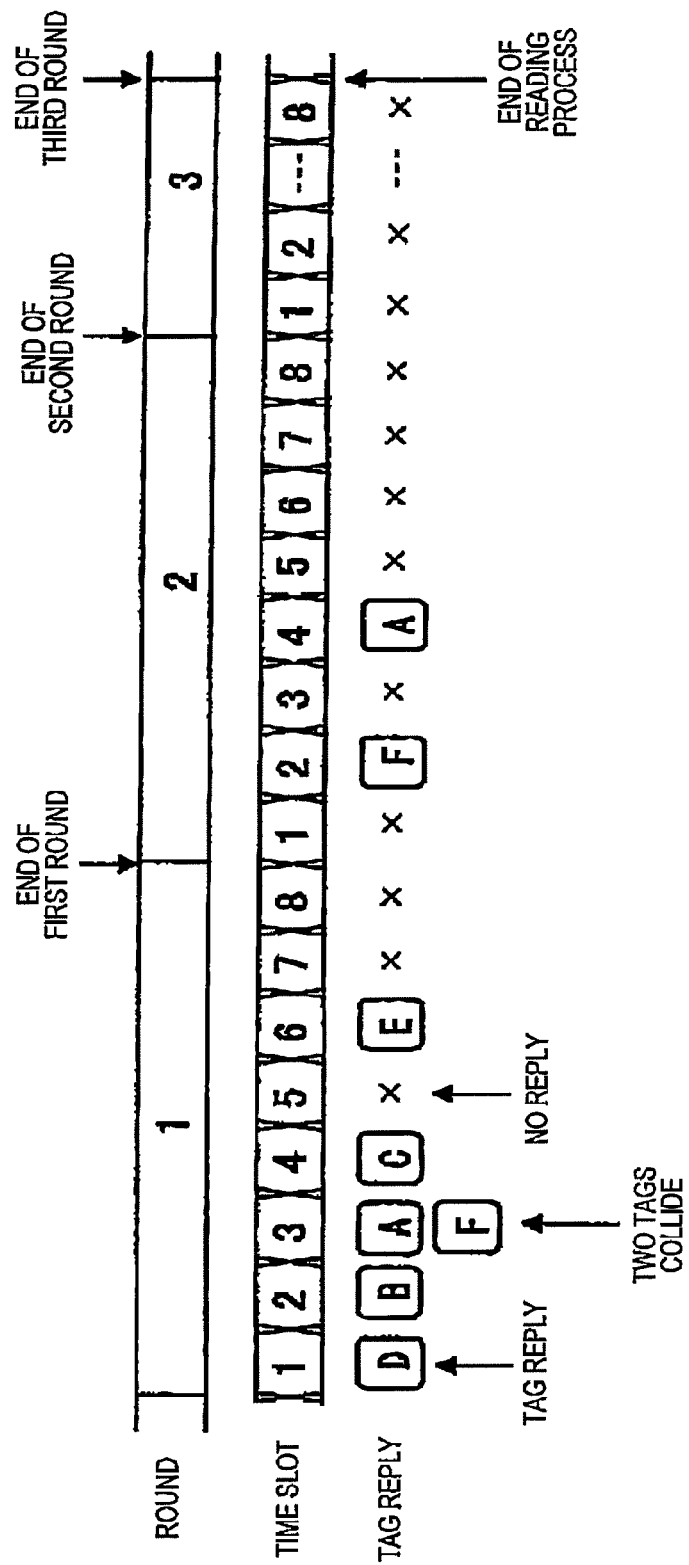
FIG. 4 is a diagram schematically illustrating the operation of the RFID system according to the first embodiment of the invention.

FIG. 3 is a flowchart illustrating the operation of the RFID system 1 according to the first embodiment of the invention and FIG. 4 is a diagram schematically illustrating the operation of the RFID system 1.

As shown in FIG. 3, in the RFID system 1, a SELECT command is transmitted from the reader-writer 3 to the RFID tags 2a to 2f to initialize various registers and the like of the RFID tags 2a to 2f (S100).

Then, the reader-writer 3 transmits a Query command 41 for specifying the number of time slots (S102). Here, the Query command 41 specifies the Q value as "3" and specifies the number of time slots in the first round as "8". When the RFID tags 2a to 2f receive the Query command 41, the random number generators 23 of the RFID tags 2a to 2f generate random numbers. It is assumed that the slot counter information of the RFID tags is "2", "1", "3", "0", "5", and "2".

The reader-writer 3 reads the RFID tags 2 in the communication area sequentially from time slot "1" to time slot "8".

Here, since the slot counter information of the RFID tag 2d is "0", only the RFID tag 2d (indicated by "D" in FIG. 4) replies in the first time slot, as shown in FIG. 4, and the reader-writer 3 reads the identification information 25b of the REID tag 2d (S108). The reader-writer 3 receives the identification information 25b via the transceiver unit 31 and stores the received identification information 25b as the identification information 34a in the memory unit 34. Accordingly, the identification information 25b of the RFID tag 2d is acquired by the reader-writer 3.

Referring to FIG. 3 again, when a reading error occurs in the transceiver unit 31 in the course of receiving the identification information 25b (S110), the reader-writer 3 prepares the reading error information 34b and temporarily stores the reading error information in the memory unit 34 (S112). When it is determined in S110 that the reading error does not occur, the process of S116 is performed. When no RFID tag 2 replies in S104, the process of S116 is performed. When it is determined in S104 that two or more RFID tags 2 collide (S106), a NAK (Non-Acknowledgement) command is transmitted (S114) and the process of S116 is performed.

Within T seconds after the identification information 25b is received in S108 or in a predetermined time after the reading error occurs in the transceiver unit 31, the reader-writer 3 reads the reading error information 34b from the memory unit 34, adds the reading error information 34b to the QueryRep command 48, and transmits the resultant command (S116). The REID tag 2d receives the QueryRep command 48 which is the reading command and the reading error detector 24 determines whether the reading error of the identification information 25b occurs in the transceiver unit 31 of the reader-writer 3 on the basis of the reading error information 34b added to the QueryRep command 48. After checking that the reading error does not occur from the detection result of the reading error detector 24, the control unit 26 of the RFID tag 2d sets the reading-completion flag 25a to the reading-completion state and does not reply to the subsequent reading command. In this way, since the control unit 26 sets the reading-completion flag 25a to the reading-completion state on the basis of the detection result of the reading error detector 24, it is possible to prevent the erroneous setting to the reading-completion state.

That is, even when a reading error occurs in the transceiver unit 31 of the reader-writer 3 and one of the QueryRep commands 48 repeatedly transmitted for a time equal to or smaller than 1/10 of the time to read the identification information 25b happens to be received by the RFID tag 2d at a regular time after T seconds, the reading-completion flag 25a is maintained in the reading-incompletion state due to the reading error detected by the reading error detector 24, thereby preventing the tag from not erroneously replying.

Here, since the reading error is not detected and the reading-completion flag 25a is set to the reading-completion state, the RFID tag 2d is controlled not to reply.

Accordingly, the control units 26 of the RFID tags 2a to 2c and the RFID tags 2e and 2f other than the RFID tag 2d decrease the values of the slot counter information 25d in the memory units 25 by one, respectively, which are "1", "0", "2", "4", and "1". The time slot is advanced to "2".

In the time slot of "2", since the slot counter information 25d of the RFID tag 2b is "0" as shown in FIG. 4, the RFID tag 2b (indicated by "B" in FIG. 4) replies (S118) and the reader-writer 3 reads the identification information 25b of the RFID tag 2b (S122). The reader-writer 3 receives the identification information 25b via the transceiver unit 31 and stores the received identification information 25b as the identification information 34a in the memory unit 34. Accordingly, the identification information 25b of the RFID tag 2b is acquired by the reader-writer 3.

Referring to FIG. 3 again, when a reading error occurs in the transceiver unit 31 in the course of receiving the identification information 25b (S124), the reader-writer 3 prepares the reading error information 34b and temporarily stores the reading error information in the memory unit 34 (S126). When it is determined in S124 that the reading error does not occur, the process of S130 is performed. When no RFID tag 2 replies in S118, the process of S130 is performed. When it is determined in S120 that two or more RFID tags 2 collide, a NAK command is transmitted (S128) and the process of S130 is performed.

Then, it is checked whether the time slot is "8", that is, the final of the first round (S130). Here, since the time slot is "2", the processes of S116 to S130 are repeated.

Within T seconds after the identification information 25b is received in S122, or when the reading error occurs in the transceiver unit 31, the reader-writer 3 reads the reading error information 34b from the memory unit 34 as described above, adds the reading error information 34b to the QueryRep command 48, and transmits the resultant command (S116). When the QueryRep command 48 as the reading command is received, the RFID tag 2b acquires the reading error information 34b from the QueryRep command 48, checks that no reading error occurs, sets the reading-completion flag 25a to the reading-completion state, and does not reply to the subsequent reading command.

In response to the QueryRep command 48 in S116, the control units 26 of the RFID tags 2a and 2c and the RFID tags 2e and 2f other than the RFID tags 2d and 2b decrease the values of the slot counter information 25d in the memory units 25 by one, respectively, which are "0", "1", "3", and "0". The time slot is advanced to "3".

In the time slot of "3", since the slot counter information 25d of the RFID tags 2a and 2f is "0", as shown in FIG. 4, the RFID tags 2a and 2f (indicated by "A" and "F" in FIG. 4) reply and transmit the identification information 25b to the reader-writer 3 via the transceiver units 21 (S112).

At this time, the reader-writer 3 receives the random number (RN16) from the RFID tags 2a and 2f (S118), but cannot normally read the random numbers due to the collision of the RFID tags 2a and 2f. Accordingly, the collision number acquiring unit 33 determines that the collision occurs (S120), transmits the NAK command (S128), and increases the inner counter (not shown) for counting the collision number by one. Accordingly, the RFID tags 2a and 2f do not transmit the identification information 25b to the reader-writer 3. As a result, the RFID tags reply to the subsequent reading command. That is, the reading-completion flag 25a is not set to the reading-completion state. The RFID tags 2a and 2f set the slot counter information 25d to the maximum value, for example, "32767" which is "7FFF" in the hexadecimal number, in accordance with the QueryRep command 48. Then, the time slot is advanced to "4".

In the time slot of "4", by the transmission of the QueryRep command 48 (S116), the values of the slot counter information of the RFID tags 2a and 2c and the RFID tags 2e and 2f are "32767", "0", "2", and "32767". Then, the processes of S116 to S130 are repeated as described above, and only the RFID tag 2c (indicated by "C" in FIG. 4) replies. Thereafter, similarly, only the RFID tag 2e (indicated by "E" in FIG. 4) replies in the time slot of "6".

When the time slot is "8", that is, when the first round is ended (S130), the number of time slots is updated (S132). Thereafter, when there is no collision in the time slots of the round or there is no reply from the RFID tags 2, the process of reading the RFID tags 2 is ended (S134).

The number of time slots is updated on the basis of the collision number maintained in the inner counter of the collision number acquiring unit 33. That is, the division number specifying unit 32 estimates the number of time slots to be used in the next round on the basis of the collision number.

When one or more collisions or replies from the RFID tags 2 exist in the round, the next round is performed. In the example shown in FIG. 4, since the RFID tags 2a and 2f collide in the time slot of "3", the second round is performed.

As shown in FIG. 4, the RFID tags 2a and 2f reply (indicated by "F" and "A" in FIG. 4) in the time slot of "2" and the time slot of "4" of the second round and transmit the identification information 25b to the reader-writer 3, by the same processes as the first round. Since no collision or reply from the RFID tags 2 occurs in the time slots of the third round, the process of reading the RFID tags 2 is ended in the final time slot of "8" of the third round.

As described above, according to the first embodiment of the invention, the RFID system 1 includes the RFID tags 2a to 2f having the tag antenna unit 20a and the tag circuit unit 20b storing the identification information 25b and the reader-writer 3 having the transceiver unit 31 reading the identification information 25b via the antenna 3a from the RFID tags 2a to 2f. When a reading command (for example, the Query command 41 or the QueryRep command 48) for reading the identification information 25b is transmitted from the transceiver unit 31 via the antenna 3a but the identification information to be acquired from one of the plural RFID tags 2a to 2f cannot be read due to the occurrence of the reading error in the transceiver unit 31, the reader-writer 3 adds the reading error information 34b indicating the occurrence of the reading error to the reading command (QueryRep command 48 or the like) to be transmitted in the next time and transmits the resultant command from the transceiver unit 31 via the antenna 3a.

The RFID tags 2 each include the tag antenna unit 20a and the tag circuit unit 20b storing the identification information 25b. The tag circuit unit 20b includes the transceiver unit 21 reading the reading command transmitted from the reader-writer 3 via the tag antenna unit 20a, the reading error detector 24 detecting the reading error information 34b of the identification information 25b added to the reading command read by the transceiver unit 21 to determine whether the reading error occurs, the reading-completion flag 25a indicating the information on whether the identification information 25b is completely read by the reader-writer 3, and the control unit 26 setting the reading-completion flag 25a on the basis of the determination result of the reading error detector 24. The control unit 26 sets the reading-completion flag 25a to hold the reading-incompletion state when the reading error is detected by the reading error detector 24, and sets the reading-completion flag 25a to the reading-completion state when the reading error is not detected by the reading error detector 24 and the identification information 25b is completely read by the reader-writer 3.

Accordingly, the RFID tags 2 can reply until the identification information 25b is normally and completely read by the reader-writer 3. Accordingly, even when the plural unspecified RFID tags 2 exist in the range where the RF waves of the reader-writer 3 arrive, it is possible to prevent a non-read RFID tag 2 from remaining.

Since the RFID tags 2 each include the reading error detector 24 detecting the reading error information 34b added to the reading command to determine whether the reading error occurs, the reading-completion flag 25a indicating the information on whether the identification information 34a is completely read by the reader-writer 3, and the control unit 26 setting the reading-completion flag 25a on the basis of the determination result of the reading error detector 24, it is possible to prevent the reading-completion flag 25a from erroneously being set to the reading-completion state.

The control unit 26 sets the reading-completion flag 25a to hold the reading-incompletion state when the reading error is detected by the reading error detector 24, and sets the reading-completion flag 25a to the reading-completion state when the reading error is not detected by the reading error detector 24 and the identification information 34a is completely read by the reader-writer 3. Accordingly, even when a reading error occurs in the transceiver unit of the reader-writer and one of the QueryRep commands repeatedly transmitted for a time equal to or smaller than 1/10 of the time to read the identification information happens to be received by the RFID tag at a regular time after T seconds, it is possible to prevent the tag from not erroneously replying.

The control unit 26 replies to the subsequent reading command when the reading-completion flag 25a is set to the reading-incompletion state, and does not reply to the subsequent reading command when the reading-completion flag 25a is set to the reading-completion state. Accordingly, since only the control unit of the RFID tag in the reading-incompletion state reply, it is possible to efficiently read the non-read RFID tag 2.

Since it can be determined whether the identification information is completely read on the basis of the reading-completion flag 25a, it is possible to omit resetting all the RFID tags 2 to avoid the reading error or the like and reading the RFID tags again.

Since the reading error information 34b is 1-bit information, it is possible to construct the reading error information with the minimum information amount.

The reading error information 34b is 1-bit information, that is, the reading error information 34b is added to the normal data when the identification information is not read. Accordingly, when the RFID tags having the function according to this embodiment are used together with the reader-writer according to this embodiment and a reader-writer not having the function according to this embodiment, the reader-writer not having the function according to this embodiment operates as in the past and the reader-writer according to this embodiment operates by checking the reading error information 34b. As a result, the RFID tags having the function according to this embodiment can be used together with the past reader-writer without any problem.

As described above, according to this embodiment of the invention, even when the QueryRep command 48 is received by the RFID tag for T seconds after the RFID tag reply of the RFID tag, it is possible to reply to the reader-writer until the reading is normally ended without setting the reading-completion flag to the reading-completion state, by adding and transmitting the reading error information 34b to the QueryRep command 48 when a reading error is detected.

(Second Embodiment)

In a second embodiment of the invention, a processing time to read the identification information of the RFID tags is reduced in the RFID system according to the first embodiment.

The entire configuration and operation of the RFID system 1 according to the second embodiment of the invention will be described now with reference to FIG. 5. The same reference numerals and signs as the first embodiment reference the same elements and description thereof is omitted.

Figure 5:
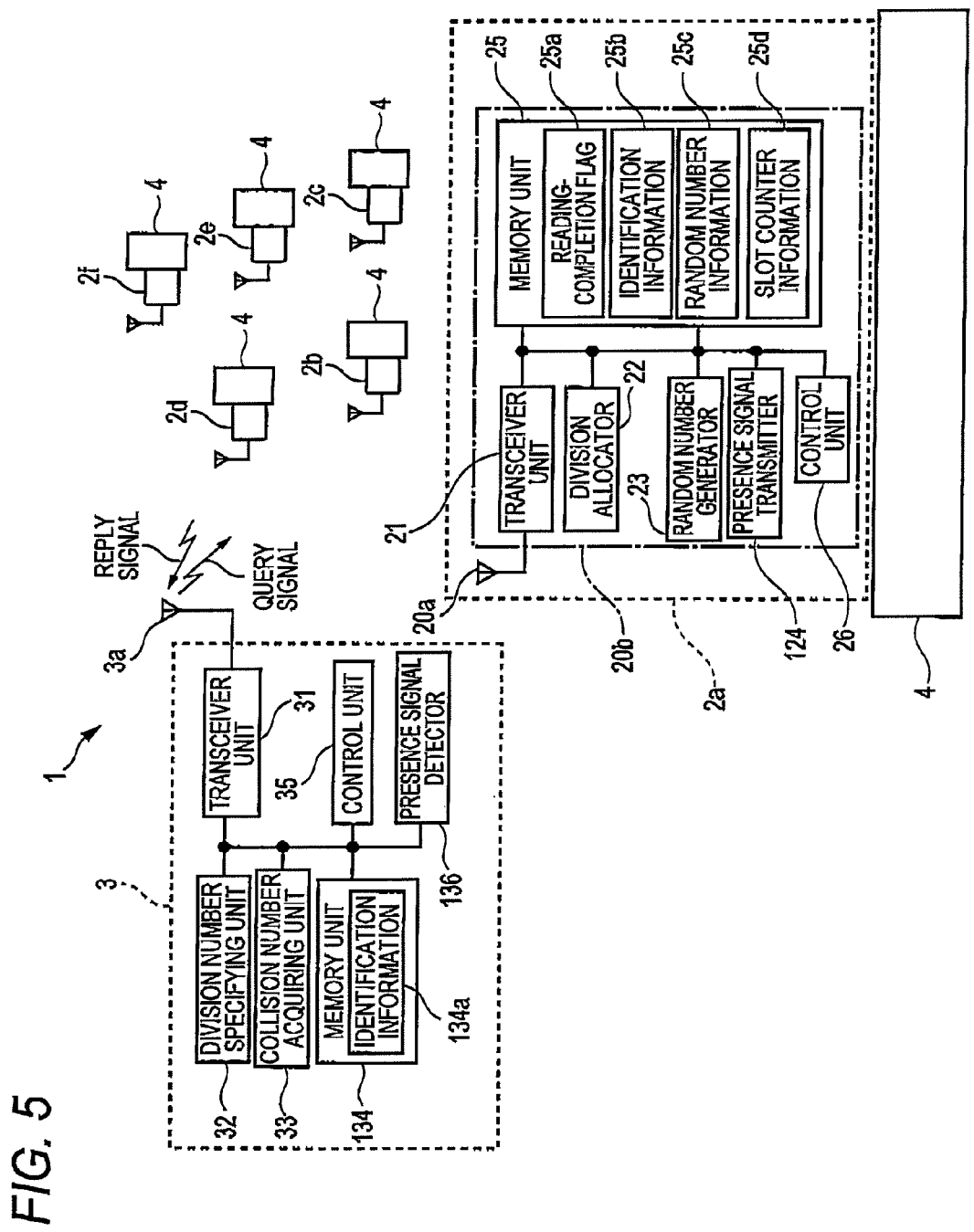
FIG. 5 is a diagram schematically illustrating an RFID system according to a second embodiment of the invention.

FIG. 5 is a diagram schematically illustrating the configuration of an RFID system 1 according to the second embodiment of the invention.

A presence signal transmitter 124 transmits a presence signal. The presence signal is used to inform the reader-writer 3 whether the RFID tags 2 to be read exist in a communication area and does not require a data part or authentication information. Accordingly, a reply signal not including the data part or the authentication information is returned as the presence signal. Since the presence can be checked only on the basis of the reflection of the RF waves from the reader-writer 3, a reply signal resulting from only the reflection and not including the data part or the authentication information may be generated by allowing the transceiver unit 21 to operate the tag antenna unit 20a. The operation of the presence signal transmitter 124 will be described later.

When the identification information 25b is normally and completely read by the reader-writer 3, the control unit 26 sets the reading-completion flag 25a to the reading-completion state. The control unit 26 controls the returning of the presence signal on the basis of the slot counter information 25d corresponding to the time slots to be described later. The control unit 26 stops the returning of the presence signal in response to the reading command, after the slot counter information 25d is "0" in a predetermined round.

The reader-writer 3 reading the identification information 25b from the RFID tags 2 has the following configuration.

That is, the reader-writer 3 includes a transceiver unit 31, a division number specifying unit 32, a collision number acquiring unit 33, a memory unit 34, a control unit 35, and a presence signal detector 136.

The presence signal detector 136 detects the presence signal to determine whether the RFID tags 2 to be read exist in the communication area. The detection output and the operation of the presence signal detector 136 will be described later.

The operation of the RFID system 1 will be described now with reference to FIGS. 6 to 8.

Figure 6:
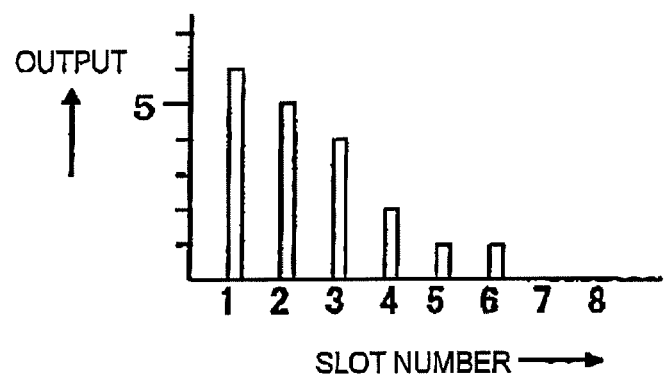
FIG. 6(a) is a diagram schematically illustrating the detection outputs of a presence signal detector in time slots of a first round in the RFID system according to the second embodiment of the invention.
FIG. 6(b) is a diagram schematically illustrating the detection outputs in the time slots of a second round according to the second embodiment of the invention.
FIG. 6(c) is a diagram schematically illustrating the detection output in the time slots of a third round according to the second embodiment of the invention.
Figure 6:
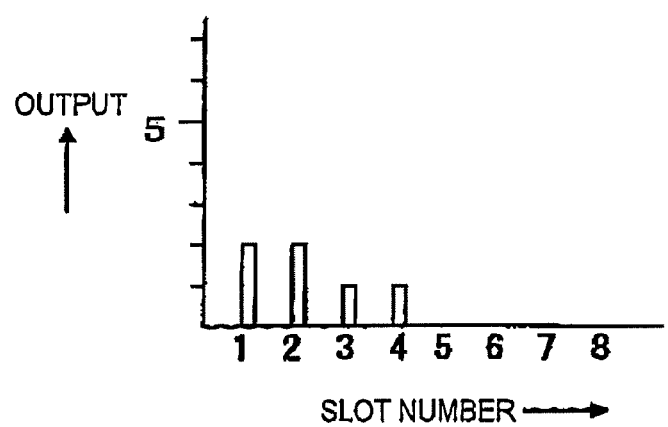
Figure 6:
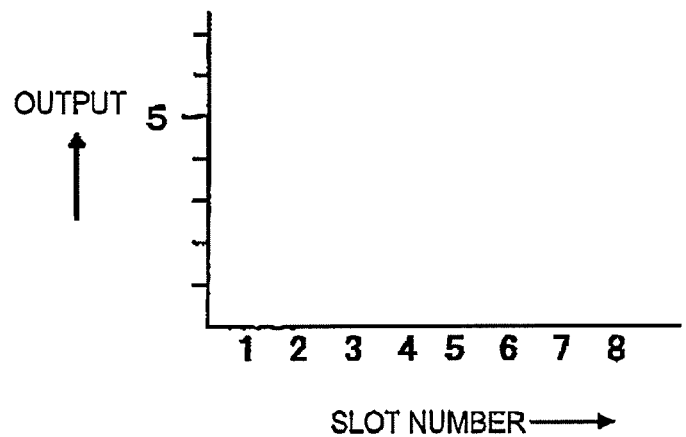

FIG. 6 shows the detection output of the presence signal detector 136 in the RFID system 1, where FIG. 6($a$) is a diagram schematically illustrating the detection output in the time slots of the first round, FIG. 6($b$) is a diagram schematically illustrating the detection output in the time slots of the second round, and FIG. 6($c$) is a diagram schematically illustrating the detection output in the time slots of the third round. FIG. 7 is a flowchart illustrating the operation of the RFID system 1 and FIG. 8 is a diagram schematically illustrating the operation of the RFID system 1.

First, for the purpose of easy understanding of the second embodiment, the operation in a comparative example of the second embodiment will be described with reference to FIG. 4 explained in the first embodiment and FIGS. 5 and 6.

The reader-writer 3 reads the identification information 25b of the RFID tags 2a to 2f existing in a communication area. As shown in FIG. 4, a Query command as a reading command is transmitted from the reader-writer 3. The Query command specifies the initial value of the Q value as "3". That is, one round includes 8 time slots. The reader-writer 3 repeatedly performs a process of collecting the identification information 25b until there is no tag reply in one round.

The RFID tags 2a to 2f allocate one of 8 time slots to the corresponding tags, when receiving the Query command. Specifically, one value of "0" to "7" generated by the random number generator 23 is allocated and is temporarily stored as the slot counter information 25d in the memory unit 25. For example, it is assumed that the values of the slot counter information 25d of the REID tags 2a to 2f are "2", "1", "3", "0", "5", and "2", respectively. It can be controlled in what time slot out of 8 time slots the tag reply is made on the basis of the slot counter information 25d.

Only the RFID tag having the slot counter information 25d of "0" out of the RFID tags 2a to 2f transmits predetermined authentication information (for example, a random number). In this example, since the slot counter information 25d of the RFID tag 2d is "0", the RFID tag 2d generates and transmits the hexadecimal random number (RN16). This random number is temporarily stored as the random number information 25c in the memory unit 25. It is assumed that the value of the random number is "0xA12B".

The reader-writer 3 receives the random number from the RFID tag 2d via the antenna 3a and the transceiver unit 31 and determines that no collision occurs when normally it can read the random number. The reader-writer returns an Ack command having the value "0xA12B" of the received random number as an argument to the RFID tag 2d.

The RFID tags 2a to 2f receive the Ack command and individually determine whether the same value of random number information 25c as the value "0xA12B" is stored in their memory units 25. Here, since only the RFID tag 2d stores the value "0xA12B" in the memory unit 25, the RFID tag 2d transmits the identification information 25b to the reader-writer 3 via the transceiver unit 21. Accordingly, one tag out of the RFID tags 2a to 2f is selected.

The reader-writer 3 receives the identification information 25b of the selected RFID tag 2d via the transceiver unit 31 and stores the received identification information 25b as the identification information 134a in the memory unit 134.

In this way, the identification information 25b of the RFID tag 2d (indicated by "D" in FIG. 2) to which the first time slot is allocated is acquired by the reader-writer 3. When the identification information 25b is normally and completely read by the reader-writer 3, the control unit 26 of the RFID tag 2d sets the reading-completion flag 25a in the memory unit 25 to the reading-completion state. Accordingly, the control unit 26 controls the RFID tag 2d not to reply to the subsequent reading command transmitted from the reader-writer 3. The control unit 26 stops the returning of the presence signal in response to the reading command after the slot counter information 25d is "0".

Then, the reader-writer 3 transmits a next QueryRep command and advances the time slot number to "2", after acquiring the identification information 25b in the first time slot.

The control units 25 of the RFID tags 2a to 2c and the RFID tags 2d and 2f having received the QueryRep command, other than the RFID tag 2d controlled not to reply, reduce the values of the slot counter information 25d of the memory units 25 by one. Accordingly, the values of the slot counter information 25d in the RFID tags 2a to 2c and the RFID tags 2e and 2f are "1", "0", "2", "4", and "1".

Figure 8:
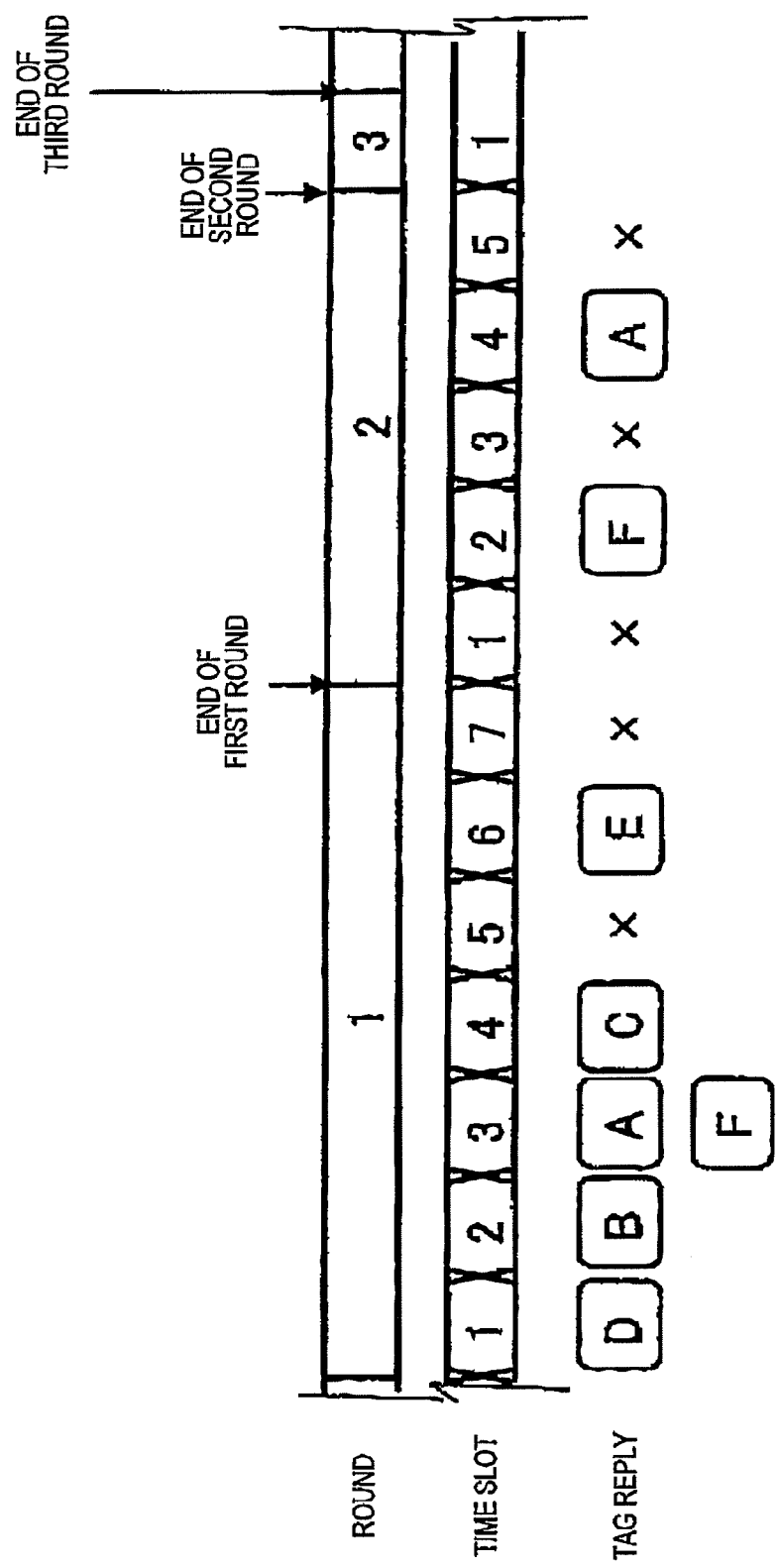
FIG. 8 is a diagram schematically illustrating the operation of the RFID system according to the second embodiment of the invention.

As a result, the RFID tag 2b (indicated by "B") in FIG. 8) replies in the second time slot. The reader-writer 3 acquires the identification information 25b of the RFID tag 2b. The reader-writer transmits the QueryRep command and advances the time slot number to "3". The RFID tag 2b sets the reading-completion flag 25a and is controlled not to reply, similarly to the RFID tag 2d. Since the slot counter information 25d of the RFID tag 2b is "0", the control unit 26 stops the returning of the presence signal in response to the subsequent reading command.

When the RFID tags 2a, 2c, 2e, and 2f receive the QueryRep command, the values of the slot counter information 25d in the memory units 25 are reduced by one. Accordingly, the values of the slot counter information 25d in the RFID tags 2a, 2c, 2e, and 2f are "0", "1", "3", and "0", respectively.

In the third time slot, since the values of the slot counter information 25d in the RFID tags 2a and 2f are "0", the RFID tags 2a and 2f (indicated by "A" and "F" in FIG. 8) reply and transmit the identification information 25b to the reader-writer 3 via the transceiver units 21, as shown in FIG. 8.

At this time, the reader-writer 3 receives predetermined information (the random number (RN16)) from the RFID tags 2a and 2f, but cannot normally read the random numbers due to the collision thereof. Accordingly, the collision number acquiring unit 33 determines that the collision occurs, transmits the NAK command, and increases the inner counter (not shown) for counting the collision number by one. As a result, since the RFID tags 2a and 2f do not transmit the identification information 25b to the reader-writer 3 via the transceiver unit 21, the reading-completion flag 25a is not set to the reading-completion state and the RFID tags reply to the subsequent reading command.

The RFID tags 2a and 2f set the slot counter information 25d to the maximum value, for example, "32767" which is "7FFF" in the hexadecimal number, in accordance with the QueryRep command. Accordingly, it is possible to prevent the slot counter information 25d from being "0" to reply again in response to the QueryRep command in the same round.

The reader-writer 3 advances the time slot number to "4". In the time slot of "4", by the transmission of the QueryRep command, the values of the slot counter information 25d of the RFID tags 2a and 2c and the RFID tags 2e and 2f are "32767", "0", "2", and "32767". Accordingly, as described above, the RFID tag 2c (indicated by "C" in FIG. 8) replies. Thereafter, similarly, only the RFID tag 2e (indicated by "E" in FIG. 8) replies in the time slot of "6". The control unit 26 stops the returning of the presence signal in response to the subsequent reading command, since the slot counter information 25d is "0".

When the time slot number is advanced to "8", the first round is ended. However, since the RFID tags 2a and 2f not read remain, the second round is performed. Similarly to the first round, one of 8 time slots is allocated to the RFID tags 2a and 2f again. The reader-writer 3 acquires the identification information 25b of the RFID tags 2a and 2f, for example, in the time slots of "2" and "4", respectively.

The reader-writer 3 performs the third round to check whether the RFID tag 2 to be read remains in the communication area, and ends the process of reading the RFID tags 2 when there is no tag reply in all the 8 time slots.

When the process of reading the RFID tags 2 is performed, the presence signal detector 136 of the reader-writer 3 detects the presence signal as shown in FIG. 6.

The detection output of the presence signal detector 136 in the first round will be described now with reference to FIG. 6(a).

In the first time slot of the first round, for example, the signal level is, for example, "6". The value "6" of the detection output is stored as a predetermined detected value in the memory unit 134. The values of the detection output acquired in the second time slot, the third time slot, the fourth time slot, the fifth time slot, and the sixth time slot are "5", "4", "2", "1", and "1", respectively. In the seventh and eighth time slots, the signal level is "0", which means that the detection output of the presence signal is not acquired. That is, it can be seen that there is no RFID tag 2 to be read in the seventh and eighth time slots.

The RFID tags 2 are controlled not to reply after they completely transmit the identification information 25b to the reader-writer 3. Accordingly, whenever the reader-writer 3 reads the identification information 25b, the signal level detected by the presence signal detector 136 is slowly decreased. When there is no RFID tag 2 to be read like the seventh and eighth time slots, the signal level is "0". Accordingly, the process of collecting the identification information 25b of the RFID tags 2 can be omitted in the seventh and eighth time slots.

The detection output of the presence signal detector 136 in the second round will be described now with reference to FIG. 6(b).

In the second round, the signal level in the first time slot is "2". The signal levels in the second time slot, the third time slot, and the fourth time slot are "2", "1", and "1", respectively. The signal levels in the fifth to eighth time slots are "0", which means that the detection output of the presence signal is not acquired. Accordingly, it can be seen that no REID tag 2 to be read exists in the fifth to eighth time slots. As a result, the process of collecting the identification information 25b of the RFID tags 2 can be omitted in the fifth to eighth time slots.

Similarly, in the third round shown in FIG. 6(c), the signal levels in the first to eighth time slots are "0", which means that the detection output of the presence signal is not acquired. Accordingly, it can be seen that no RFID tag 2 to be read exists in the first to eighth time slots. As a result, the process of collecting the identification information 25b of the RFID tags 2 can be omitted in the first to eighth time slots.

As described above, the reader-writer 3 can detect the presence signal by the use of the presence signal detector 136 and can determine that no RFID tag 2 to be read exists from the detection output.

Therefore, in this embodiment, the reader-writer includes the presence signal detector 136 detecting the presence signals, which are returned from the REID tags 2a to 2f after a reading command is transmitted to the RFID tags 2a to 2f, via the antenna 3a and the transceiver unit 31 and the control unit 35 controlling the process of collecting the identification information 25b on the basis of the presence signal detected by the presence signal detector 136. The control unit 35 ends the process of collecting the identification information 25b when the detection output of the presence signal is not acquired by the presence signal detector 136.

The reader-writer 3 detects the existence of the RFID tags 2a to 2f to be read in the communication area on the basis of the presence signal and does not perform the process of collecting the identification information 25b in an empty slot where no tag to be read exists, thereby reducing the processing time. Accordingly, even when the number of time slots increases to suppress the increase of the probability of collision, it is possible to reduce the processing time.

The operation of the RFID system 1, which is a feature of the second embodiment, will be described now with reference to FIG. 7.

Figure 7:
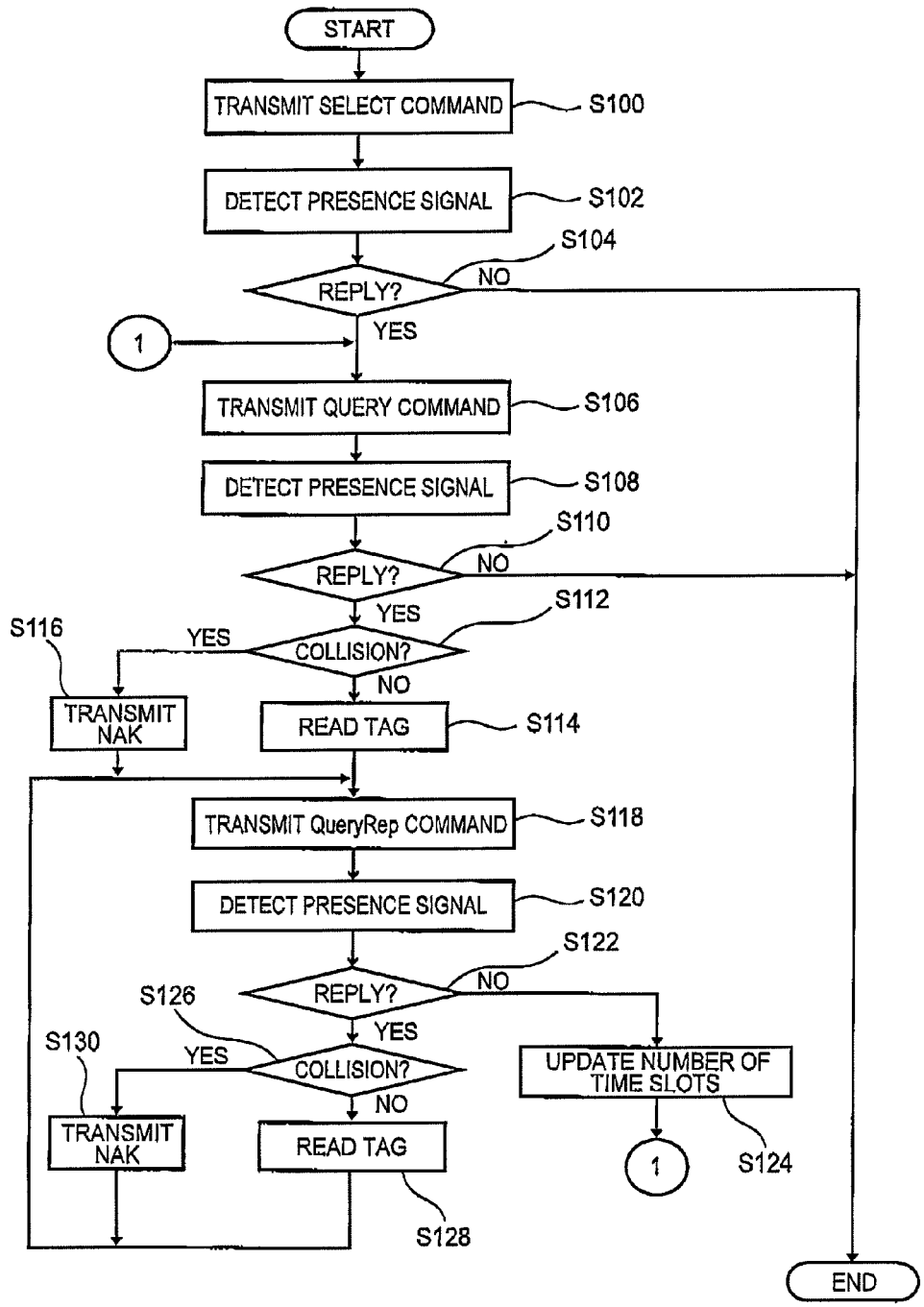
FIG. 7 is a flowchart illustrating the operation of the RFID system according to the second embodiment of the invention.

As shown in FIG. 7, in the RFID system 1, a SELECT command is transmitted from the reader-writer 3 to the RFID tags 2a to 2f to reset various registers and the like of the RFID tags 2a to 2f to initial states (S100). The RFID tags 2a to 2f having received the SELECT command return the presence signals. The reader-writer 3 temporarily stores the magnitude of the presence signals detected after transmitting the SELECT command in the memory unit 134 as a predetermined detected value (reference value). The reason for setting the magnitude of the presence signal after transmitting the SELECT command as a reference is that all tags in the communication area reply.

The reader-writer 3 detects the presence signals by the use of the presence signal detector 136 (S102) and determines whether the RFID tags 2 to be read exist from the detection output (S104). The reader-writer 3 ends the process of collecting the identification information 25b when the detection output of the presence signal is not acquired.

When the RFID tags 2 to be read exist, the reader-writer 3 transmits a Query command and specifies the number of time slots (S106). Here, it is assumed that the Q value is "3", that is, the number of time slots of the first round is "8".

When the RFID tags 2a to 2f receive the Query command, the random number generators 23 of the RFID tags generate random numbers and store as the slot counter information 25d. Here, it is assumed that the values of the slot counter information 25d are "2", "1", "3", "0", "5", and "2". The control units 26 of the RFID tags 2a to 2f store the slot counter information 25d in the memory units 25, respectively. The RFID tags 2a to 2f return the presence signals in response to the Query command.

The reader-writer 3 reads the RFID tags 2 in the communication area sequentially from the first time slot to the eighth time slot.

In the first time slot, the reader-writer 3 detects the presence signals by the use of the presence signal detector 136 (S108) and determines whether the RFID tags 2 to be read exist on the basis of the detection output (S110). When the detection output of the presence signal is not acquired by the presence signal detector 136, the reader-writer 3 determines that no RFID tag 2 to be read exists in the communication area and ends the process of collecting the identification information 25b.

On the other hand, when the RFID tags 2 to be read exist, the reader-writer 3 checks whether there is no collision on the basis of the authentication information (S112). When two or more RFID tags 2 collide, the reader-writer transmits a NAK command (S116) and performs the process of S118.

The reader-writer 3 reads the identification information 25b of the RFID tag 2d when there is no collision (S114). In the first time slot, since the slot counter information 25b of the RFID tag 2d is "0", only the RFID tag 2d (indicated by "D" in FIG. 8) replies, as shown in FIG. 8. The reader-writer 3 receives the identification information 25b via the transceiver unit 31 and stores the received identification information 25b as the identification information 134a in the memory unit 134. Accordingly, the identification information 25b of the RFID tag 2d is acquired by the reader-writer 3. The RFID tag 2d sets the reading-completion flag 25a so as not to reply to the subsequent reading command. Since the slot counter information 25d of the RFID tag 2d is "0", the control unit 26 stops the returning of the presence signal in response to the subsequent reading command.

The reader-writer 3 transmits a QueryRep command (S118). The control units 26 of the RFID tags 2a to 2c and the RFID tags 2e and 2f decrease the values of the slot counter information 25d stored in the memory units 25 by one, which are "1", "0", "2", "4", and "1". The reader-writer 3 advances the time slot number to "2".

In the second time slot, the reader-writer 3 detects the presence signals by the use of the presence signal detector 136 and determines whether the RFID tags 2 to be read exist from the detection output thereof (S110). When the detection output of the presence signals is not acquired, the reader-writer 3 sets the number of time slots on the basis of the predetermined detected value, and allocates the time slots to the RFID tags 2 completely not read again (S124). The reader-writer performs the next round in S106.

On the other hand, when the RFID tags 2 to be read exist, the reader-writer 3 checks whether there is no collision (S126). When two or more RFID tags 2 collide, the reader-writer transmits the NAK command (S130) and performs the process of S118 again.

The reader-writer 3 reads the identification information 25b of the RFID tag 2b when there is no collision (S128). In the second time slot, since the slot counter information 25d of the RFID tag 2b is "0", only the RFID tag 2b (indicated by "B" in FIG. 8) replies, as shown in FIG. 8. The reader-writer 3 receives the identification information 25b via the transceiver unit 31 and stores the received identification information 25b as the identification information 34a in the memory unit 134. Accordingly, the identification information 25b of the RFID tag 2b is acquired by the reader-writer 3. The RFID tag 2b sets the reading-completion flag 25a so as not to reply to the subsequent reading command. Since the slot counter information 25d of the RFID tag 2b is "0", the control unit 26 stops the returning of the presence signal in response to the subsequent reading command.

The reader-writer 3 transmits a QueryRep command again in S118. The control units 26 of the RFID tags 2a, 2c, 2e, and 2f decrease the values of the slot counter information 25d in the memory units 25 by one, which are "0", "1", "3", and "0". The reader-writer 3 advances the time slot number to "3".

In the time slot of "3", since the slot counter information 25d of the RFID tags 2a and 2f are "0", the RFID tags 2a and 2f (indicated by "A" and "F" in FIG. 8) replies, as shown in FIG. 8 and transmit the identification information 25b to the reader-writer 3 via the transceiver unit 21 (S128). At this time, since the reader-writer 3 normally cannot read the random number due to the collision of the RFID tags 2a and 2f, the reader-writer 3 determines that there is a collision (S126) and transmits the NAK command (S130). The collision number acquiring unit 33 increases the inner counter (not shown) counting the collision number by one. Accordingly, the RFID tags 2a and 2f do not transmit the identification information 25*b* to the reader-writer 3 via the transceiver units 21 and do not set the reading-completion flag 25*a*. The RFID tags reply to the subsequent reading command. When receiving the QueryRep command, the RFID tags 2*a* and 2*f* sets the slot counter information 25*d* to the maximum value of, for example, "32767". The reader-writer 3 advances the time slot number to "4".

In the time slot of "4", when the QueryRep command is transmitted from the reader-writer 3 (S118), the values of the slot counter information 25*d* of the RFID tags 2*a*, 2*c*, 2*e*, and 2*f* are "32767", "0", "2", and "32767". Accordingly, the processes of S118 to S130 are performed as described above, whereby the RFID tag 2*c* (indicated by "C" in FIG. 8) replies. Thereafter, similarly, the RFID tag 2*e* (indicated by "E" in FIG. 8) replies in the time slot of "6". The control unit 26 stops the returning of the presence signal in response to the subsequent reading command, since the slot counter information 25*d* is "0".

In the time slot of "7", the detection output of the presence signal is not acquired by the presence signal detector 136. Accordingly, the control unit 35 of the reader-writer 3 determines that no RFID tag 2 to be read exists (S122) and allocates the time slots again (S124). The reader-writer performs the next round from S106.

In S124, the division number specifying unit 32 updates the number of time slots on the basis of the magnitude of the detection output of the presence signals detected by the presence signal detector 136. In the second embodiment, the control unit 35 of the reader-writer 3 increases the division number of the division number specifying unit 32 when the magnitude of the presence signals is greater than a predetermined detected value temporarily stored in the memory unit 134, and decreases the division number when the magnitude of the presence signals is smaller than the predetermined detected value. The number of time slots may be updated on the basis of the combination of the collision number stored in the inner counter of the collision number acquiring unit 33 and the magnitude of the presence signals.

By performing the second round similarly, as shown in FIG. 8, the RFID tags 2*a* and 2*f* reply (indicated by "F" and A" in FIG. 8) in the time slots of "2" and "4" of the second round and transmit the identification information 25*b* to the reader-writer 3. In the time slot of "5", the reader-writer 3 does not acquire the detection output of the presence signals from the presence signal detector 136. Accordingly, the control unit 35 of the reader-writer 3 determines that there is no RFID tag 2 to be read and does not perform the process of collecting the identification information 25*b* in the sixth to eighth time slots.

In the third round, the reader-writer 3 does not acquire the detection output of the presence signals from the presence signal detector 136 in the time slot of "1". Accordingly, the control unit 35 of the reader-writer 3 determines that there is no RFID tag 2 to be read and does not perform the process of collecting the identification information 25*b* in the sixth to eighth time slots. Then, the reader-writer 3 ends the process of collecting the identification information 25*b*.

In this way, by allowing the reader-writer 3 to perform the operations shown in FIG. 7, it is possible to reduce the number of time slots where the process of collecting the identification information 25*b* is performed. That is, the number of time slots where the process of collecting the identification information 25*b* is performed is 24 in the comparative example shown in FIG. 4, but is 13 in FIG. 8, which is greatly decreased. In addition to the above-mentioned time slots, the process of acquiring the authentication information is omitted in three time slots.

As described above, according to the second embodiment of the invention, the reader-writer 3 includes the antenna 3*a*, the transceiver unit 31 communicating with the RFID tags 2*a* to 2*f* storing the identification information 25*b* via the antenna 3*a*, the presence signal detector 136 detecting the presence signal returned from the RFID tags 2*a* to 2*f* via the antenna 3*a* and the transceiver unit 31 after transmitting the reading command to the RFID tags 2*a* to 2*f*, and the control unit 35 controlling the process of collecting the identification information 25*b* on the basis of the presence signal detected by the presence signal detector 136. The control unit 35 ends the process of collecting the identification information 25*b* when the detection output of the presence signal is not obtained from the presence signal detector 136. Accordingly, the reader-writer 3 can reduce the processing time by determining whether the RFID tags 2*a* to 2*f* to be read exist in the communication area on the basis of the detection of the presence signal and not performing the process of collecting the identification information 25*b* in an empty slot where no tag to be read exists. As a result, even when the number of slots increases to suppress the increase of the probability of collision, it is possible to reduce the processing time.

The RFID tags 2 according to the second embodiment each include the tag antenna unit 20*a* and the tag circuit unit 20*b* connected to the tag antenna unit 20*a*. The tag circuit unit 20*b* includes the transceiver unit 21 communicating with the reader-writer 3 via the tag antenna unit 20*a*, the presence signal transmitter 124 returning the presence signal via the transceiver unit 21, and the memory unit 25 storing the identification information 25*b*. When a reading command transmitted from the reader-writer 3 is received by the transceiver unit 21, the presence signal transmitter 124 returns the presence signal to the reader-writer 3 via the transceiver unit 21. Accordingly, it is possible to inform the reader-writer 3 whether an RFID tag 2 to be read exists in the communication area. As a result, it is possible to reduce the processing time, by allowing the reader-writer 3 not to perform the process of collecting the identification information 25*b* in an empty slot where no tag to be read exists. Accordingly, even when the number of slots increases to suppress the increase of the probability of collision, it is possible to reduce the processing time of the reader-writer 3.

Since the RFID system 1 according to the second embodiment of the invention includes the RFID tags 2*a* to 2*f* and the reader-writer 3 reading the identification information 25*b* from the RFID tags 2*a* to 2*f*, the reader-writer 3 can determine whether the RFID tags 2*a* to 2*f* to be read exist in the communication area on the basis of the detection of the presence signals returned from the RFID tags 2*a* to 2*f* and can be controlled not to perform the process of collecting the identification information 25*b* in the empty slot where no tag to be read exists, thereby reducing the processing time. Accordingly, even when the number of slots increases to suppress the increase of the probability of collision, it is possible to reduce the processing time.

By combining the RFID system 1 according to the second embodiment of the invention with the RFID system 1 according to the first embodiment, it is possible to prevent a non-read RFID tag 2 from remaining even when plural unspecified RFID tags 2 exist in the range where the RF waves of the reader-writer 3 arrive and to reduce the processing time even when the number of slots increases to suppress the increase of the probability of collision.

Since the reader-writer 3 includes the division number specifying unit 32 specifying the division number of time slots and the control unit 26 controls the division number specified by the division number specifying unit 32 on the basis of the magnitude of the presence signal detected by the presence signal detector 136, it is possible to efficiently determine the division number of time slots.

That is, since the division number of time slots is determined on the basis of the presence signal, it is possible to prevent the division number of time slots from excessively being set great for the existing RFID tags 2 to elongate the time to read the RFID tags 2 or to prevent the division number of time slots from excessively being set small to excessively increase the number of collisions at the time of reading the RFID tags.

The control unit 35 increases the division number when the magnitude of the presence signal is greater than a predetermined detected value, and decreases the division number when the magnitude of the presence signal is smaller than the predetermined detected value. Accordingly, it is possible to easily increase or decrease the division number on the basis of the predetermined detected value.

The tag circuit unit 20b includes the reading-completion flag 25a indicating the information on whether the identification information 25b is completely read by the reader-writer 3 and the control unit 26 making a control on the basis of the information of the reading-completion flag 25a. The control unit 26 stops returning the presence signal in response to the reading command when the reading-completion flag 25a is set to the reading-completion state. Accordingly, it is possible to easily determine the magnitude of the presence signal of the RFID tag which is not completely read.

The tag circuit unit 20b includes the control unit 26 controlling the returning of the presence signal on the basis of the slot counter information 25d and the control unit 26 stops the returning of the presence signal in response to the reading command after the slot counter information is 0 in a predetermined round. Accordingly, it is possible to easily determine the magnitude of the presence signal of the RFID tag which is not completely read.

In this embodiment, the number of existing RFID tags is estimated on the basis of the magnitude of the presence signal.

(Third Embodiment)

In a third embodiment of the invention, a decrease in reading efficiency is suppressed even when a new RFID tag is added in a predetermined communication area in the RFID system according to the first embodiment.

The entire configuration and operation of the RFID system 1 according to the third embodiment of the invention will be described now with reference to FIG. 9.

Figure 9:
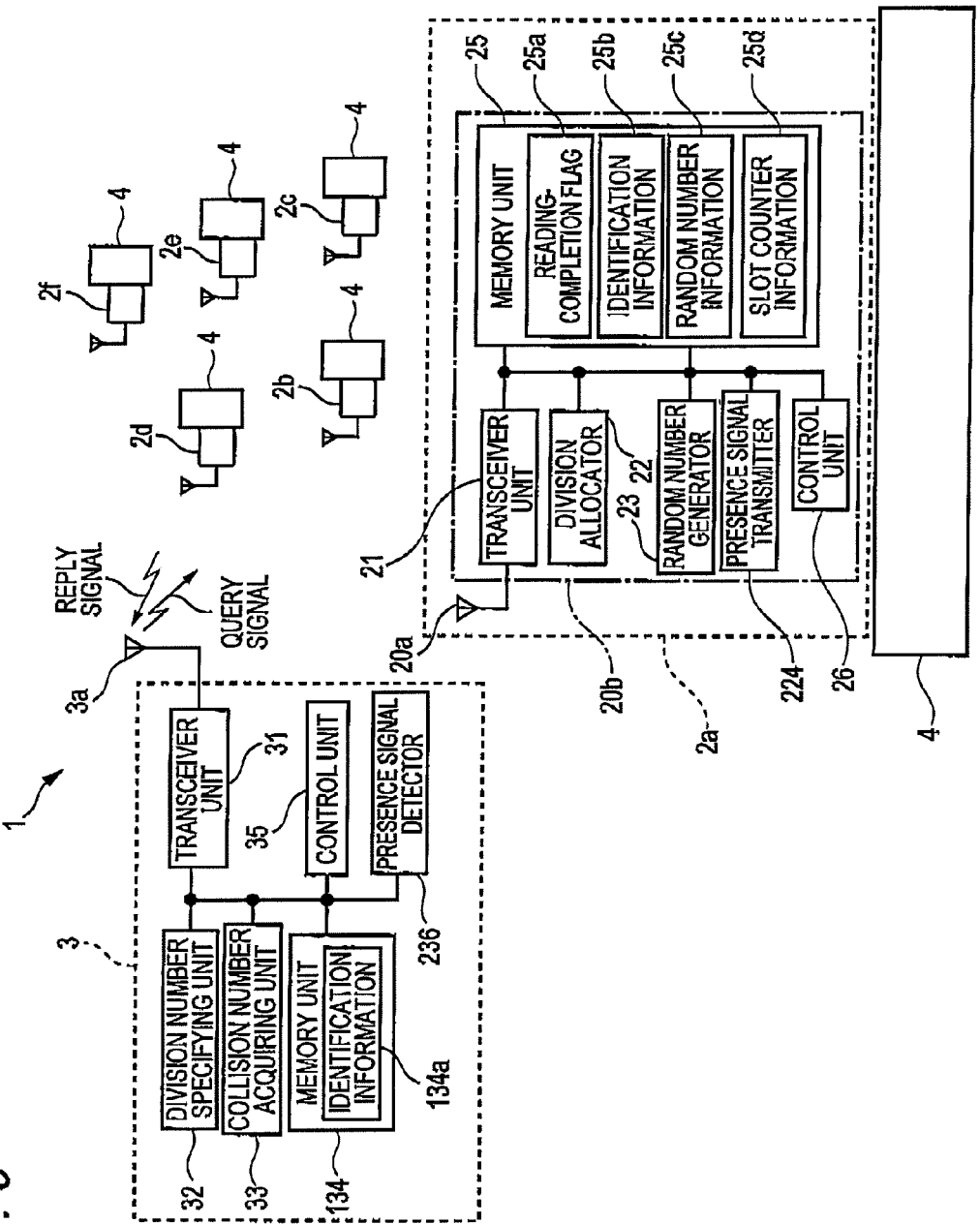
FIG. 9 is a diagram schematically illustrating an RFID system according to a third embodiment of the invention.

FIG. 9 is a diagram schematically illustrating the configuration of the RFID system 1 according to the third embodiment of the invention. The same reference numerals and signs as FIG. 1 according to the first embodiment reference the same elements and description thereof is omitted.

An auxiliary flag 224 is a flag holding operation information of the reading-completion flag 25a for a predetermined time. The setting of the auxiliary flag 224 will be described later.

A reading-completion flag 25a, identification information 25b, random number information 25c, and slot counter information 25d are stored in the memory unit 25. The identification information 25b includes identification information (such as product name, product number, manufacturing date, and forwarding date) of the managing articles 4. The random number information 25c temporarily stores a random number generated by the random number generator 23. The slot counter information 25d temporarily stores the value of the time slot number allocated to the corresponding tag.

The control unit 26 includes a central processing unit (CPU), a read only memory (ROM) storing various programs and a control program, and a random access memory (RAM) temporarily storing data or the like and controls the constituent circuits. When the identification information 25b is normally read by the reader-writer 3, the control unit 26 sets the reading-completion flag 25a to a reading-completion state. When receiving a reset command or an auxiliary reset command via the tag antenna unit 20a and the transceiver unit 21 from the reader-writer 3, the control unit 26 sets the auxiliary flag 224. When the reading-completion flag 25a is set to the reading-completion state, the control unit 26 sets the auxiliary flag 224.

The reader-writer 3 has the following configuration to read the identification information 25b from the RFID tags 2. That is, the reader-writer 3 includes a transceiver unit 31, a division number specifying unit 32, a collision number acquiring unit 33, a memory unit 134, a control unit 35, and an auxiliary reset command transmitter 236.

The auxiliary reset command transmitter 236 transmits an auxiliary reset command for initializing the identification information 25b to the RFID tags 2 via the transceiver unit 31 and the antenna 3a on the basis of the information stored in the auxiliary flag 24. The details of the auxiliary reset command will be described later.

The operation of the RFID system 1 will be described now with reference to FIGS. 10 to 14.

Figure 10:
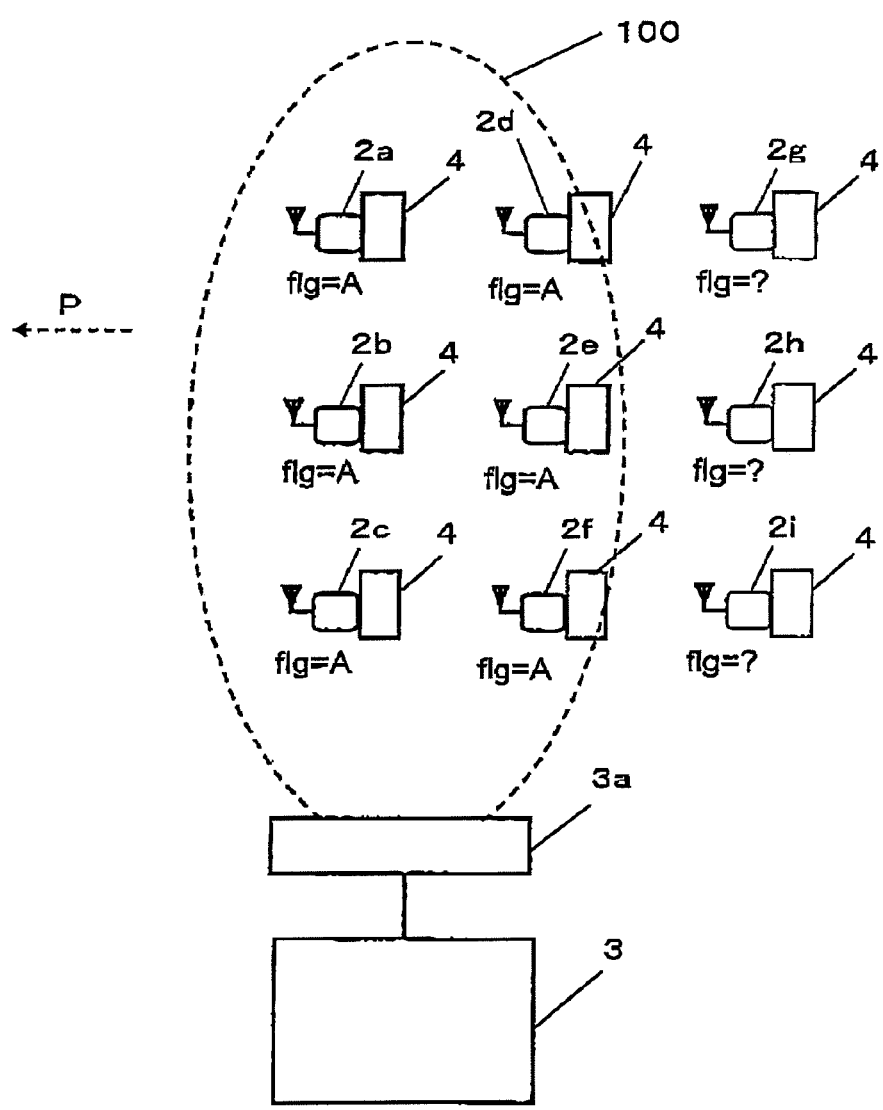
FIG. 10 is a diagram schematically illustrating an operation of a comparative example of the RFID system according to the third embodiment of the invention.
Figure 11:
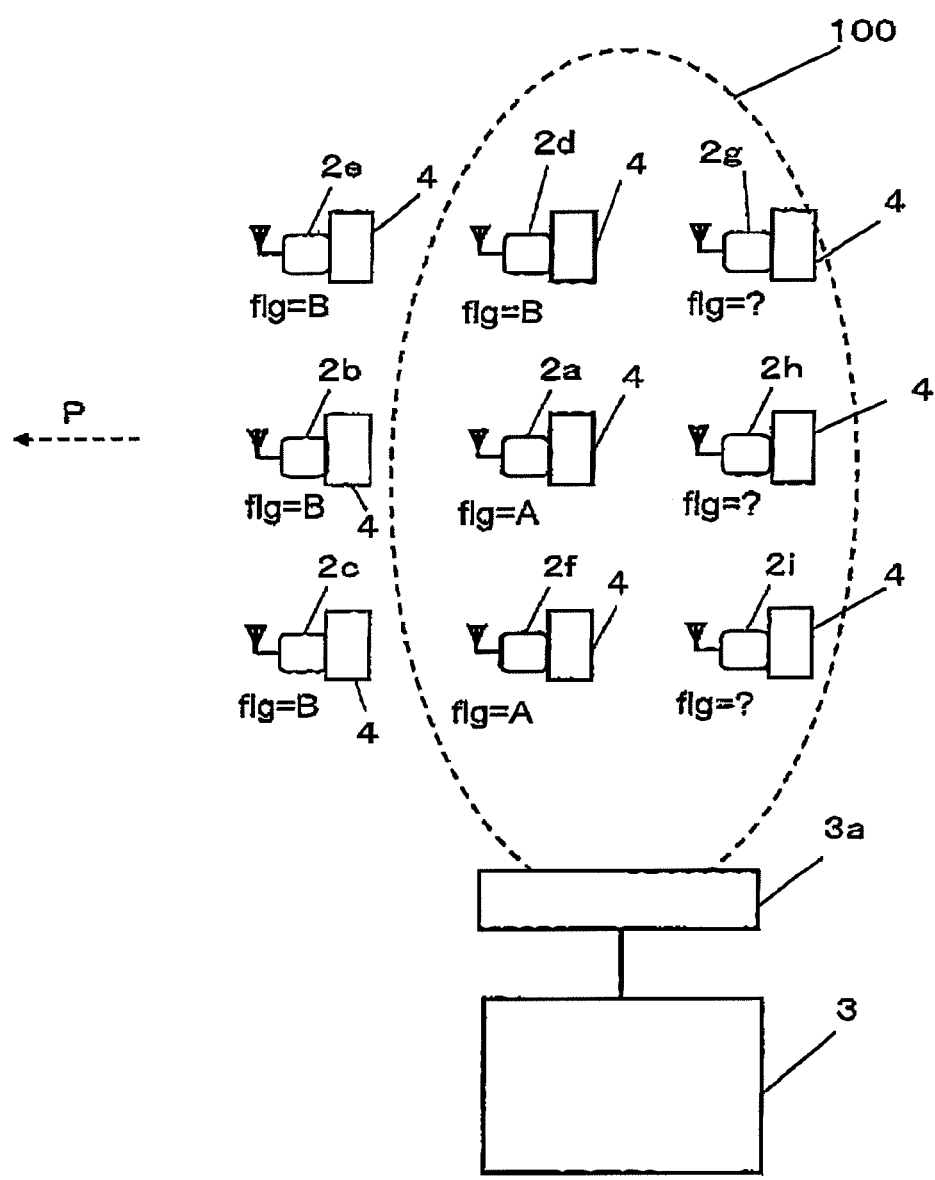
FIG. 11 is a diagram schematically illustrating another operation of the comparative example of the RFID system according to the third embodiment of the invention.
Figure 12:
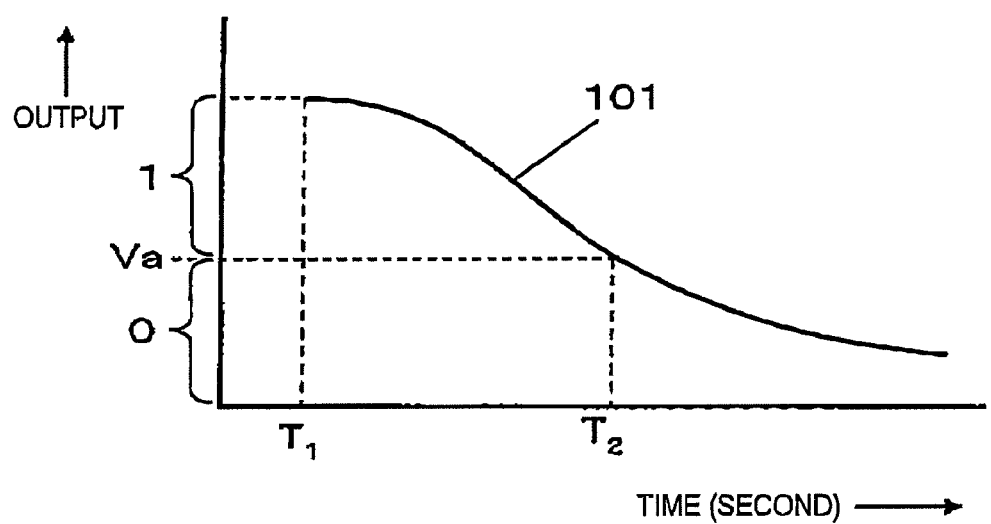
FIG. 12 is a conceptual diagram illustrating the operation of an auxiliary flag of an RFID tag in the RFID system according to the third embodiment of the invention.
Figure 13:
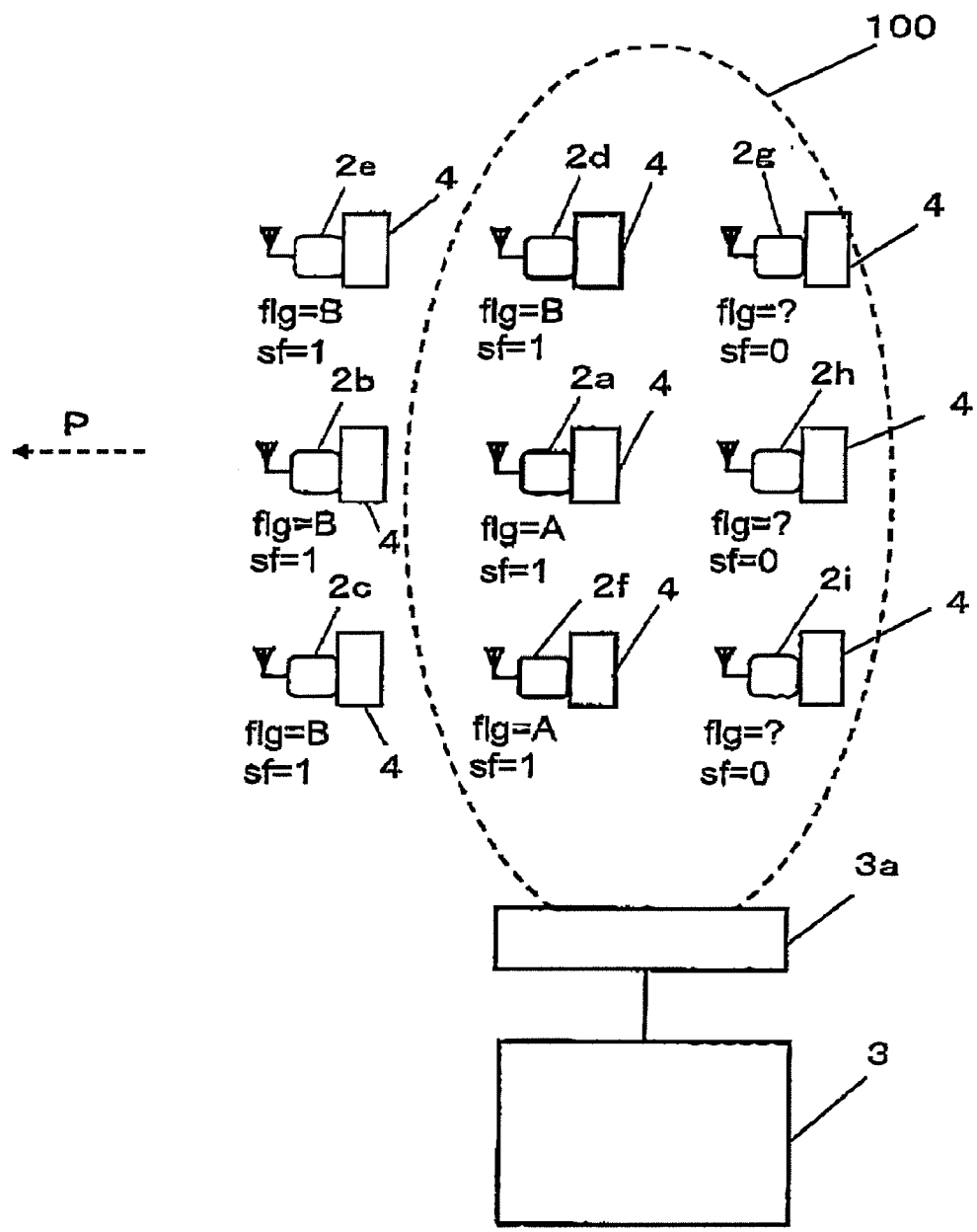
FIG. 13 is a diagram schematically illustrating the operation before initialization of the RFID system according to the third embodiment of the invention.
Figure 14:
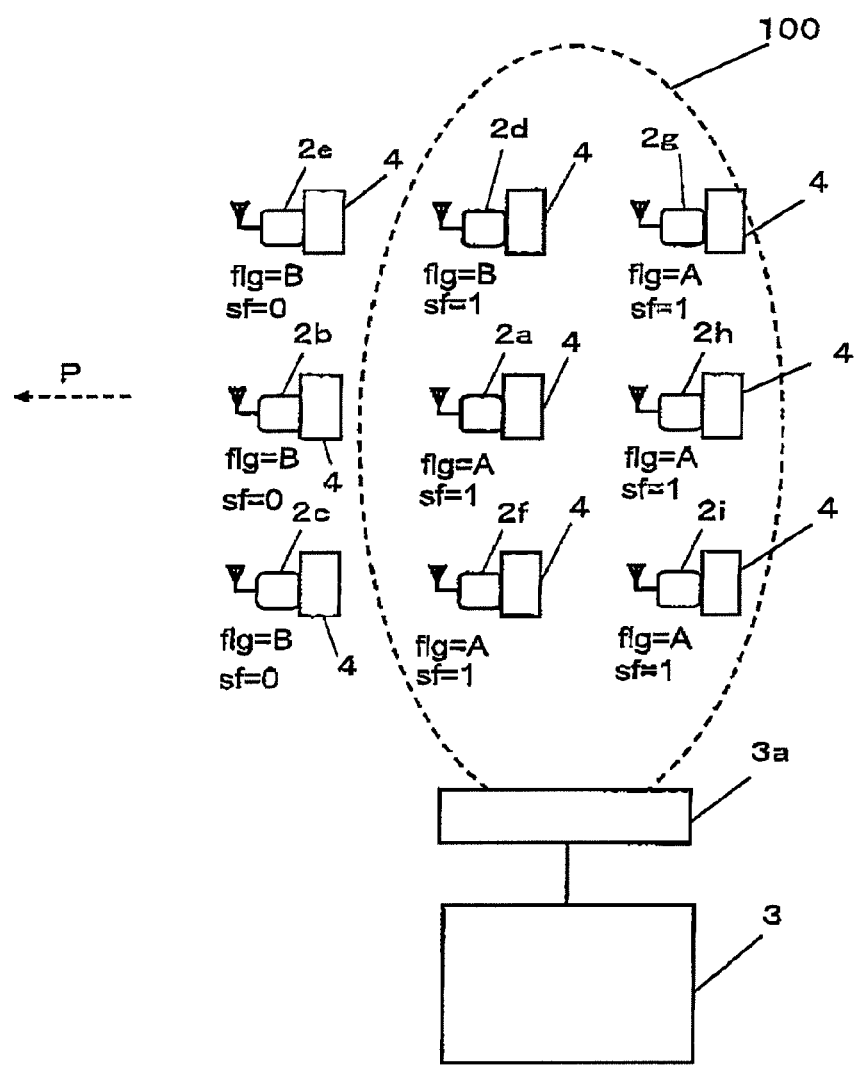
FIG. 14 is a diagram schematically illustrating the operation after initialization of the RFID system according to the third embodiment of the invention.

FIG. 10 is a diagram schematically illustrating an operation of a comparative example of the RFID system 1 according to the third embodiment of the invention. FIG. 11 is a diagram schematically illustrating another operation of the comparative example of the RFID system 1. FIG. 12 is a conceptual diagram illustrating the operation of the auxiliary flag 224 of an RFID tag in the RFID system 1. FIG. 13 is a diagram schematically illustrating the operation of the RFID system 1 before initialization and FIG. 14 is a diagram schematically illustrating the operation of the RFID system 1 after initialization.

First, for the purpose of easy understanding of the third embodiment, a comparative example of the third embodiment will be described with reference to FIGS. 9 to 11. The reader-writer 3 reads the identification information 25b of the REID tags 2a to 2f existing in a communication area.

As shown in FIG. 10, When a SELECT command as an initialization command is transmitted from the reader-writer 3 via the antenna 3a, the RFID tags 2a to 2f located in the communication area 100 out of the RFID tags 2a to 2i moving in the direction of P are initialized. In FIG. 10, the reading-completion flags 25a of the RFID tags 2a to 2f are set to the reading-incompletion state "A" by the in initialization command. At this time, the RFID tags 2g to 2i located outside the communication area 100 are not initialized. A Query command is transmitted to specify the Q value of the number of time slots. For example, the Q value is specified as "3". Accordingly, the reader-writer 3 constructs one round with 8 time slots and repeatedly performs the process of collecting the identification information 25b of the RFID tags 2a to 2f until there is no tag reply in the round.

When the RFID tags 2a to 2f receives the Query command via the tag antenna unit 20a and the transceiver unit 21, the random number generator 23 allocates one of 8 time slots to the corresponding tag on the basis of the Q value (the number of time slots) included in the Query command. Specifically, one value of "0" to "7" generated by the random number generator 23 is allocated and is temporarily stored as the slot counter information 25d in the memory unit 25. For example, it is assumed that the values of the slot counter information 25d of the RFID tags 2a to 2f are "2", "1", "3", "0", "5", and "2", respectively. It can be controlled in what time slot out of 8 time slots the tag reply is made on the basis of the slot counter information 25d.

Only the RFID tag having the slot counter information 25d of "0" out of the RFID tags 2a to 2f generates and transmits predetermined authentication information, for example, a hexadecimal random number (RN16) in this case. In this example, since the slot counter information 25d of the RFID tag 2d is "0", the RFID tag 2d generates and transmits the hexadecimal random number (RN16). This random number is temporarily stored as the random number information 25c in the memory unit 25. It is assumed that the value of the random number is "0xA12B".

The reader-writer 3 receives the random number from the RFID tag 2d via the antenna 3a and the transceiver unit 31 and determines that no collision occurs when it can normally read the random number. The reader-writer transmits an Ack command having the value "0xA12B" of the received random number as an argument to the RFID tag 2d.

The RFID tags 2a to 2f receive the Ack command and individually determine whether the same random number as the value "0xA12B" is stored in their memory units 25. Here, since only the RFID tag 2d stores the value "0xA12B" as the random number information 25c in the memory unit 25, the RFID tag 2d transmits the identification information 25b stored in the memory unit 25 to the reader-writer 3 via the transceiver unit 21. Accordingly, one tag out of the RFID tags 2a and 2f is selected.

The reader-writer 3 receives the identification information 25b of the selected RFID tag 2d via the transceiver unit 31 and stores the received identification information 25b as the identification information 134a in the memory unit 134.

In this way, the identification information 25b of the RFID tag 2d to which the first time slot is allocated is read by the reader-writer 3. When the identification information 25b is normally read by the reader-writer 3, the control unit 26 of the RFID tag 2d sets the reading-completion flag 25a in the memory unit 25 to the reading-completion state "B". Accordingly, the control unit 26 controls the RFID tag 2d not to reply to the subsequent reading command transmitted from the reader-writer 3.

Then, the reader-writer 3 transmits a QueryRep command and advances the time slot number to "2".

The RFID tags 2a to 2c and the RFID tags 2e and 2f having received the QueryRep command, other than the RFID tag 2d controlled not to reply, reduce the values of the slot counter information 25d in the memory units 25 by one. Accordingly, the values of the slot counter information 25d in the RFID tags 2a to 2c and the RFID tags 2e and 2f are "1", "0", "2", "4", and "1", respectively.

As a result, the RFID tag 2b replies in the second time slot. The reader-writer 3 acquires the identification information 25b of the RFID tag 2b, transmits the QueryRep command and sets the time slot number to "3". The RFID tag 2b sets the reading-completion flag 25a to the reading-completion state "B" and is controlled not to reply to the subsequent reading command transmitted from the reader-writer 3, similarly to the RFID tag 2d.

When the RFID tags 2a, 2c, 2e, and 2f receive the QueryRep command, the values of the slot counter information 25d in the memory units 25 are reduced by one. Accordingly, the values of the slot counter information 25d in the RFID tags 2a, 2c, 2e, and 2f are "0", "1", "3", and "0", respectively. In the third time slot, since the values of the slot counter information 25d in the REID tags 2a and 2f are "0", the RFID tags 2a and 2f reply and transmit the identification information 25b to the reader-writer 3 via the transceiver units 21, as shown in FIG. 10.

At this time, the reader-writer 3 receives the random number (RN16) as the predetermined information from the RFID tags 2a and 2f, but cannot normally read the random numbers due to the collision thereof. Accordingly, the collision number acquiring unit 33 determines that the collision occurs, transmits the NAK command, and increases the inner counter (not shown) for counting the collision number by one. As a result, the RFID tags 2a and 2f do not transmit the identification information 25b to the reader-writer 3 via the transceiver units 21 thereof and reply to the subsequent reading command. That is, the RFID tags 2a and 2f do not set the reading-completion flag 25a to the reading-completion state.

The RFID tags 2a and 2f set the slot counter information 25d to the maximum value, for example, "32767" which is "7FFF" in the hexadecimal number, in accordance with the QueryRep command. Accordingly, it is possible to prevent the slot counter information 25d from being "0" to reply again in response to the QueryRep command in the same round.

The reader-writer 3 advances the time slot number to "4". In the time slot of "4", by the transmission of the QueryRep command, the values of the slot counter information 25d of the RFID tags 2a and 2c and the RFID tags 2e and 2f are "32767", "0", "2", and "32767". Accordingly, as described above, only the RFID 2c replies. Thereafter, similarly, only the RFID tag 2e replies in the time slot of "6". When the time slot number is advanced to "8", the first round is ended.

However, since the RFID tags 2a and 2f not read remain, the second round is performed. Similarly to the first round, one of 8 time slots is allocated to the RFID tags 2a and 2f. The reader-writer 3 acquires the identification information 25b of the RFID tags 2a and 2f, for example, in the time slots of "2" and "4", respectively.

The reader-writer 3 performs the third round to check whether the RFID tag 2 to be read remains in the communication area 100 due to the collision or the like, and ends the process of reading the RFID tags 2 when there is no tag reply in all the 8 time slots.

The operation of the RFID system 1 has been schematically described. A feature of the third embodiment of the invention will be described now.

As shown in FIGS. 10 and 11, since the RFID tags 2 move in the direction of P, it is assumed that new RFID tags 2g to 2i are added to the communication area 100, as shown in FIG. 11, in the course of performing the process of reading the RFID tags 2a to 2f. In this case, the reading-completion flags 25a of the RFID tags 2g to 2i are floated in the initial states and thus require the initialization.

When the new RFID tags 2g to 2i are initialized, all the RFID tags 2 in the communication area 100 are together initialized and thus the reading-completion flag 25a of the RFID tag 2d having been subjected to the reading process is also initialized. Accordingly, since the RFID tag 2d having been subjected already to the reading process should be read again, there is a problem that the reading efficiency is reduced.

An object of the third embodiment is to suppress the decrease in reading efficiency, even when a new RFID tag is added to the communication area 100. The RFID system 1 includes RFID tags 2a to 2i storing the identification information 25b and a reader-writer 3 reading the identification information 25b from the RFID tags 2a to 2i. The RFID tags 2a to 2i each include a reading-completion flag 25a holding information on whether the identification information 25b is completely read, an auxiliary flag 224 holding information on whether the reading-completion flag 25a is initialized, and a control unit 26 setting the reading-completion flag 25a or the auxiliary flag 224. The reader-writer 3 includes an auxiliary reset command transmitter 236 transmitting an auxiliary reset command for initialization to the RFID tags 2a to 2i on the basis of the information of the reading-completion flag 25a and the auxiliary flag 224.

The control unit 26 sets the auxiliary flag 224 to the information indicating initialization when the reading-completion flag 25a is initialized to the reading-incompletion state. The control unit 26 initializes the reading-completion flag 25a using the auxiliary reset command when the auxiliary flag 224 is set to the information indicating non-initialization.

Accordingly, it is possible to initialize only the reading-completion flags 25a of the RFID tags 2g to 2i using the auxiliary reset command. Therefore, even when new RFID tags 2g to 2i are added to the communication area 100 (FIG. 11), only the reading-completion flags 25a of the new RFID tags 2g to 2i can be initialized without initializing the reading-completion flags 25a of the initialized RFID tags 2a, 2d, and 2f, out of the RFID tags 2a, 2d, and 2f and the RFID tags 2g to 2i, thereby not repeatedly reading the RFID tag 2d having been already subjected to the reading process. Accordingly, it is possible to suppress the decrease in reading efficiency.

When a usual initialization command (SELECT command or the like) is received, the reading-completion flag 25a is forcibly set to the reading-incompletion state and the auxiliary flag 224 is forcibly set to the information indicating non-initialization.

The auxiliary flag 224 is switched to the information indicating non-initialization when a predetermined time passes after it is set to the information indicating initialization.

For example, as shown in FIG. 12, when the auxiliary flag 224 is set to the information (for example, information of "1") indicating initialization at time $T_1$, the voltage 101 is slowly damped from time $T_1$ on the basis of a predetermined time constant, and the voltage becomes Va at time $T_2$. Here, the auxiliary flag is switched to the information indicating non-initialization by a comparison process with a threshold value Va.

In this way, the auxiliary flag 24 operates to hold the information (for example, information of "1") for a predetermined time $(T_2-T_1)$. The predetermined time can be set to a time sufficient to read the RFID tags 2, and can be set to, for example, 1 second. For example, on the basis of the time constant CR formed by a capacitor C and a resistor R as the predetermined time constant, the voltage 101 decreases.

In this way, since the auxiliary flag 24 holds the information indicating initialization for a predetermined time and is switched to the information indicating non-initialization after the predetermined time passes, it is possible to initialize the reading-completion flag 25a to read the identification information 25b by the use of the reader-writer 3 installed in a different place.

When the reading-completion flag 25a is set from the reading-incompletion state to the reading-completion state, the control unit 26 sets the auxiliary flag 224 to the information indicating initialization. Accordingly, even when the auxiliary flag 24 is switched to the information indicating non-initialization after a predetermined time, it can be set to the information indicating initialization again just after the complete reading and thus the RFID tags 2 having been subjected to the complete reading are not read repeatedly. Accordingly, it is possible to suppress the decrease in reading efficiency.

The operation of the RFID system 1 will be described now with reference to FIGS. 13 and 14.

As shown in FIG. 13, when the auxiliary reset command is transmitted from the antenna 3a of the reader-writer 3 before initialization, the reading-completion flags 25a are set to the reading-incompletion state by the control units 26 of the REID tags 2g to 2i out of the RFID tags 2a, 2d, and 2f and the RFID tags 2g to 2i existing in the communication area 100 and the auxiliary flags 24 are set to the information indicating initialization.

Accordingly, as shown in FIG. 14, in the initialized state, the reading-completion flags 25a of the RFID tags 2g to 2i are initialized to the reading-incompletion state "A". For example, the auxiliary flag 24 is set to "1" which indicates the reading-incompletion state. The auxiliary flag 24 is automatically reset to "0" after a predetermined time passes.

Thereafter, the reader-writer 3 transmits a Query command to the RFID tags 2e, 2d, and 2f and the RFID tags 2g to 2i via the antenna 3a to allocate the time slots and acquires the identification information 25b. The reader-writer 3 sequentially transmits reading commands such as the QueryRep command and acquires the identification information 25b of the RFID tags 2e and 2f and the RFID tags 2g to 2i.

According to the third embodiment of the invention described above, the RFID system 1 includes the RFID tags 2a to 2i storing the identification information 25b and the reader-writer 3 reading the identification information 25b from the RFID tags 2a to 2i. The RFID tags 2a to 2i each include the reading-completion flag 25a holding the information on whether the identification information 25b is completely read, the auxiliary flag 224 holding the information on whether the reading-completion flag 25a is initialized, and the control unit 26 setting the reading-completion flag 25a or the auxiliary flag 224. The reader-writer 3 includes the auxiliary reset command transmitter 236 transmitting the auxiliary reset command for initialization based on the information of the reading-completion flag 25a and the auxiliary flag 224 to the RFID tags 2a to 2i.

Accordingly, it is possible to initialize only the reading-completion flags 25a of the RFID tags 2g to 2i using the auxiliary reset command. Therefore, even when new RFID tags 2g to 2i (FIG. 13) are added to the communication area 100, it is possible to initialize only the reading-completion flags 25a of the new RFID tags 2g to 2i without initializing the reading-completion flags 25a of the initialized RFID tags 2a, 2d, and 2f again out of the RFID tags 2a, 2d, and 2f and the RFID tags 2g to 2i, thereby repeatedly not reading the RFID tag 2d having been already subjected to the reading process. Accordingly, it is possible to suppress the decrease in reading efficiency even when a new RFID tag is added to a predetermined communication area.

By combining the RFID system 1 according to the third embodiment of the invention with the RFID system 1 according to the first embodiment, it is possible to prevent a non-read RFID tag 2 from remaining even when plural unspecified RFID tags 2 exist in the range where the RF waves of the reader-writer 3 arrive and to suppress the decrease in reading efficiency even when a new RFID tag is added to a predetermined communication area.

The control unit 26 sets the auxiliary flag 224 to the information indicating initialization when the reading-completion flag 25a is initialized to the reading-incompletion state.

The control unit 26 initializes the reading-completion flag 25a using the auxiliary reset command when the auxiliary flag 224 is set to the information indicating non-initialization.

The control unit 26 sets the auxiliary flag 224 to the information indicating initialization when the reading-completion flag 25a is set from the reading-incompletion state to the reading-completion state.

The auxiliary flag 224 is switched to the information indicating non-initialization when a predetermined time passes after it is set to the information indicating initialization.

When the auxiliary flag 224 has initialization information, it means the followings. That is, when the auxiliary flag 224 stands up (when the auxiliary flag 224 is set to 1), it means that it is initialized. When the auxiliary flag 224 is set to 0, it means that it is not initialized.

That is, when the auxiliary flag 224 is set to 1, it means that the auxiliary reset command is not accepted and the reading-completion flag 25a is not initialized. When the auxiliary flag 224 is set to 0, it means that the auxiliary reset command is accepted and the reading-completion flag 25a is initialized.

When the auxiliary reset command is accepted or when the reading-completion flag 25a is initialized, the auxiliary flag is set to 1 as the information indicating initialization.

Accordingly, the state of the reading-completion flag 25a can be held for a predetermined time and the reading-completion flag 25a of the RFID tag 2 can be set by the auxiliary reset command. Accordingly, it is possible to prevent a non-read RFID tag 2 from remaining even when plural unspecified RFID tags 2 exist in the range where the RF waves of the reader-writer 3 arrive and to suppress the decrease in reading efficiency even when a new RFID tag is added to a predetermined communication area.

The first to third embodiments of the invention have been described independently of each other, but may be combined.

This application claims the benefit of Japanese Patent application No. 2008-253138 filed on Sep. 30, 2008, Japanese Patent application No. 2008-253139 filed on Sep. 30, 2008, Japanese Patent application No. 2008-253140 filed on Sep. 30, 2008, the entire contents of which are incorporated herein by reference.

What is claimed is:

1. A radio frequency identification (RFID) system, comprising:
   a plurality of RFID a tags, each having a tag antenna and a tag circuit that stores identification information; and
   a reader-writer including a first transceiver that reads the identification information of the plurality of RFID tags using an antenna,
   wherein, when the identification information is not read from one of the plurality of RFID tags due to an occurrence of a reading error in the first transceiver after a reading command for reading the identification information is transmitted from the first transceiver via the antenna, the reader-writer adds reading error information, which indicates the occurrence of the reading error, to a next reading command to be transmitted, and transmits the next reading command from the first transceiver via the antenna, and
   wherein each of the plurality of RFID tag includes:
      a reading error detector that analyzes the reading error information added to the reading command to determine whether the reading error occurs;
      a reading-completion flag that indicates information on whether the identification information is completely read by the reader-writer; and
      a controller that sets the reading-completion flag based on a determination result of the reading error detector.

2. The RFID system according to claim 1, wherein the controller
   sets the reading-completion flag to a reading-incompletion state when the reading error is detected by the reading error detector, and
   sets the reading-completion flag to a reading-completion state when the reading error is not detected by the reading error detector and the identification information is completely read by the reader-writer.

3. The RFID system according to claim 2, wherein the controller replies to a subsequent reading error when the reading-completion flag indicates the reading-incompletion state and does not reply to the subsequent reading error when the reading-completion flag indicates the reading-completion state.

4. The RFID system according to claim 1, wherein the reading error information is 1-bit information.

5. A radio frequency identification (RFID) system, comprising:
   a plurality of RFID tags, each having a tag antenna and a tag circuit that stores identification information; and
   a reader-writer including a first transceiver that reads the identification information of the plurality of RFID tags using an antenna,
   wherein, when the identification information is not read from one of the plurality of RFID tags due to an occurrence of a reading error in the first transceiver after a reading command for reading the identification information is transmitted from the first transceiver via the antenna, the reader-writer adds reading error information, which indicates the occurrence of the reading error, to a next reading command to be transmitted and transmits the next reading command from the first transceiver via the antenna,
   wherein the tag circuit of each of the plurality of RFID tags includes a second transceiver that communicates with the reader-writer via the tag antenna, a presence signal transmitter that returns a presence signal to the reader-writer via the second transceiver when the reading command is received from the reader-writer via the second transceiver, and a memory that stores the identification information, and
   wherein the reader-writer includes a presence signal detector that detects the presence signal returned from the plurality of RFID tags via the antenna and the first transceiver after transmitting the reading command to the plurality of RFID tags, and a controller that controls a process of collecting the identification information based on the presence signal detected by the presence signal detector, the controller ending the process of collecting the identification information when the presence signal is not detected by the presence signal detector.

6. The RFID system according to claim 5, wherein the reader-writer includes a division number specifier that specifies a division number of time slots, and the controller controls the division number to be specified by the division number specifier based on a magnitude of the presence signal detected by the presence signal detector.

7. The RFID system according to claim 6, wherein the controller increases the division number when the magnitude of the presence signal is greater than a predetermined detected value and decreases the division number when the magnitude of the presence signal is less than the predetermined detected value.

8. The RFID system according to claim 5, wherein the tag circuit includes a reading-completion flag that indicates information on whether the identification information is completely read by the reader-writer and a controller that performs a control based on the information of the reading-completion flag, and
   the controller stops returning the presence signal in response to the reading command when the reading-completion flag includes the information indicating the reading-completion state.

9. The RFID system according to claim 5, wherein the tag circuit includes a controller that controls a return of the presence signal based on slot counter information, and
- the controller stops returning the presence signal in response to the reading command after the slot counter information is 0 in a predetermined round.

10. The RFID system according to claim 5, wherein the reading error information is 1-bit information.

11. A radio frequency identification (RFID) system comprising:
- a plurality of RFID tags, each having a tag antenna and a tag circuit that stores identification information; and
- a reader-writer including a first transceiver that reads the identification information of the plurality of RFID tags using an antenna,
- wherein, when the identification information is not read from one of the plurality of RFID tags due to an occurrence of a reading error in the first transceiver after a reading command for reading the identification information is transmitted from the first transceiver via the antenna, the reader-writer adds reading error information, which indicates the occurrence of the reading error, to a next reading command to be transmitted and transmits the next reading command from the first transceiver via the antenna,
- wherein each of the plurality of RFID tags includes a reading-completion flag that indicates whether the identification information is completely read, an auxiliary flag that indicates whether the reading-completion flag is initialized, and a controller that sets one of the reading-completion flag and the auxiliary flag, and
- wherein the reader-writer includes an auxiliary reset command transmitter that transmits an auxiliary reset command to the plurality of RFID tags for initializing the reading-completion flag based on a state of the auxiliary flag.

12. The RFID system according to claim 11, wherein the auxiliary flag indicates initialization when a corresponding RFID tag receives the auxiliary reset command.

13. The RFID system according to claim 11, wherein the controller initializes the reading-completion flag based on the auxiliary reset command when the auxiliary flag indicates non-initialization.

14. The RFID system according to claim 11, wherein the controller sets the auxiliary flag to indicate non-initialization when the reading-completion flag is switched to a reading-completion state from a reading-incompletion state.

15. The RFID system according to claim 11, wherein the auxiliary flag is switched to a non-initialized state in a predetermined time after the auxiliary flag is set to indicate an initialization.

16. The RFID system according to claim 11, wherein the reading error information is 1-bit information.

17. A radio frequency identification tag, comprising:
- a tag antenna; and
- a tag circuit that stores identification information,
- wherein the tag circuit includes a transceiver that reads a reading command transmitted from a reader-writer via the tag antenna, a reading error detector that analyzes reading error information of the identification information added to the reading command read by the transceiver to determine whether a reading error occurs, a reading-completion flag that indicates whether the identification information is completely read by the reader-writer, and a controller that sets the reading-completion flag based on a determination result of the reading error detector, and
- wherein the controller sets the reading-completion flag to a reading-incompletion state when the reading error is detected by the reading error detector, and sets the reading-completion flag to a reading-completion state when the reading error is not detected by the reading error detector and the identification information is completely read by the reader-writer.

* * * * *